United States Patent
Nakai et al.

(10) Patent No.: US 10,622,603 B2
(45) Date of Patent: Apr. 14, 2020

(54) BATTERY PACK AND METHOD FOR PRODUCING SAME

(71) Applicant: Nissan Motor Co., Ltd., Yokohama-shi, Kanagawa (JP)

(72) Inventors: Masayuki Nakai, Kanagawa (JP); Yasuhiro Yanagihara, Kanagawa (JP); Manabu Fukuoka, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 0 days.

(21) Appl. No.: 15/767,896

(22) PCT Filed: Oct. 22, 2015

(86) PCT No.: PCT/JP2015/079903
§ 371 (c)(1),
(2) Date: Apr. 12, 2018

(87) PCT Pub. No.: WO2017/068708
PCT Pub. Date: Apr. 27, 2017

(65) Prior Publication Data
US 2018/0309101 A1    Oct. 25, 2018

(51) Int. Cl.
*H01M 2/10* (2006.01)
*H01M 2/20* (2006.01)
(Continued)

(52) U.S. Cl.
CPC ......... *H01M 2/1077* (2013.01); *H01M 2/206* (2013.01); *H01M 10/613* (2015.04);
(Continued)

(58) Field of Classification Search
CPC .. H01M 2/206; H01M 2/1077; H01M 10/613; H01M 10/625; H01M 10/6555; H01M 2220/20
See application file for complete search history.

(56) References Cited

U.S. PATENT DOCUMENTS 8,808,907 B2    8/2014  Matsuo et al.
9,186,999 B2   11/2015  Yokoyama
(Continued)

FOREIGN PATENT DOCUMENTS

CN        1845360 A    10/2006
CN      102369625 A     3/2012
(Continued)

*Primary Examiner* — Osei K Amponsah
(74) *Attorney, Agent, or Firm* — Global IP Counselors, LLP

(57) ABSTRACT

A battery pack includes battery modules and a base member on which the battery modules are mounted. The battery modules include a plurality of unit cells are stacked in a thickness direction, have a flat shape and positive and negative terminals for transferring input and output of electric power. The terminals are disposed on an opposite side of the base member side in the battery module. The unit cells include a cell body that includes a power generation element and an electrode tab. The battery module includes a pair of first cover members in the stacking direction and a pair of second cover members in a direction that intersects with the stacking direction and that intersects with a direction in which the electrode tab extends. The second cover members are joined to the first cover members while the stacked unit cells are pressurized in the stacking direction.

9 Claims, 20 Drawing Sheets

(51) Int. Cl.
  *H01M 10/613* (2014.01)
  *H01M 10/6555* (2014.01)
  *H01M 10/625* (2014.01)
  *H01M 10/0525* (2010.01)

(52) U.S. Cl.
  CPC ..... *H01M 10/625* (2015.04); *H01M 10/6555* (2015.04); *H01M 10/0525* (2013.01); *H01M 2220/20* (2013.01)

(56) References Cited

U.S. PATENT DOCUMENTS

| | | | |
|---|---|---|---|
| 9,865,849 B2 | 1/2018 | Kayano et al. | |
| 2006/0246350 A1* | 11/2006 | Takayama | B60L 3/0046 429/178 |
| 2011/0045335 A1* | 2/2011 | Lee | H01M 2/1077 429/120 |
| 2015/0037642 A1 | 2/2015 | Pinon et al. | |
| 2015/0064542 A1* | 3/2015 | Noh | H01M 2/1016 429/156 |
| 2015/0104686 A1 | 4/2015 | Brommer et al. | |

FOREIGN PATENT DOCUMENTS

| | | |
|---|---|---|
| EP | 2 927 990 A2 | 10/2015 |
| JP | 2006-253060 A | 9/2006 |
| JP | 2006-313733 A | 11/2006 |
| JP | 2009-146795 A | 7/2009 |
| JP | 2011-23257 A | 2/2011 |
| JP | 2012-523087 A | 9/2012 |
| JP | 2012-204040 A | 10/2012 |
| JP | 2013-229266 A | 11/2013 |
| JP | 2015-2264 A | 1/2015 |
| JP | 2015-5361 A | 1/2015 |
| JP | 2015-520922 A | 7/2015 |
| JP | 2015-195136 A | 11/2015 |
| KR | 10-2012-0005727 A | 1/2012 |
| KR | 10-2013-0018312 A | 2/2013 |
| WO | 2011/040297 A1 | 4/2011 |
| WO | 2013/118874 A1 | 8/2013 |
| WO | 2014/073443 A1 | 5/2014 |

* cited by examiner

BATTERY PACK AND METHOD FOR PRODUCING SAME

CROSS-REFERENCE TO RELATED APPLICATIONS

This application is a U.S. National stage application of International Application No. PCT/JP2015/079903, filed on Oct. 22, 2015.

BACKGROUND

Field of the Invention

The present invention relates to a battery pack and a method for producing same.

Background Information

In recent years, in the automobile industry, the development of secondary batteries and fuel cells have been widely carried out, from the point of view of environmental protection and fuel economy. Since the output of each battery in a secondary battery is not very high, a desired number thereof are stacked to form a battery module, in order to enable cruising speed in an automobile possible. In addition, there are cases in which a predetermined number of battery modules are assembled into a battery pack (also called an assembled battery). As a conventional technique relating to battery packs, Japanese Laid Open Patent Application No. 2015-5361 (hereinafter referred to as Patent Document 1) is configured by stacking battery modules, obtained by stacking a predetermined number of cells (also called unit cells), in the height direction.

SUMMARY

A battery pack requires many battery cells and battery modules in order to generate a predetermined amount of electric power. Accordingly, numerous wirings for withdrawing electric power from the battery pack also become necessary. Since a battery pack requires many such wirings, depending on the manner in which the wirings are attached, the layout of the battery pack changes significantly, and there is the risk that the operating space for producing the battery pack will be affected.

An object of the present invention is to provide a battery pack that improves the efficiency of the operating space for attaching wiring to a battery module, and a method for producing the same.

The present invention for achieving the object described above comprises a plurality of battery modules that is equipped with a plurality of unit cells that is formed into a flat shape and is stacked in the thickness direction, and also equipped with positive and negative terminals for carrying out the input and output of electric power, and a base member on which the plurality of battery modules is mounted. The terminals of the plurality of battery modules are disposed at an end portion on the opposite side of the base member side, and the plurality of battery modules is arranged on a mounting surface of the base member for the plurality of battery modules, along the mounting surface.

The present invention for achieving the object described above is a method for producing a battery pack, comprising a plurality of battery modules that is equipped with a plurality of unit cells that is formed into a flat shape and is stacked in the thickness direction, and also equipped with positive and negative terminals for carrying out the input and output of electric power. In the production method described above, a plurality of battery modules is disposed on a base member, such that the terminals are positioned at an end portion on the opposite side of the side on which the base member is positioned, and a plurality of battery modules is arranged on a mounting surface of the base member for the plurality of battery modules, along the mounting surface.

DETAILED DESCRIPTION OF EMBODIMENTS

Figure 1A:
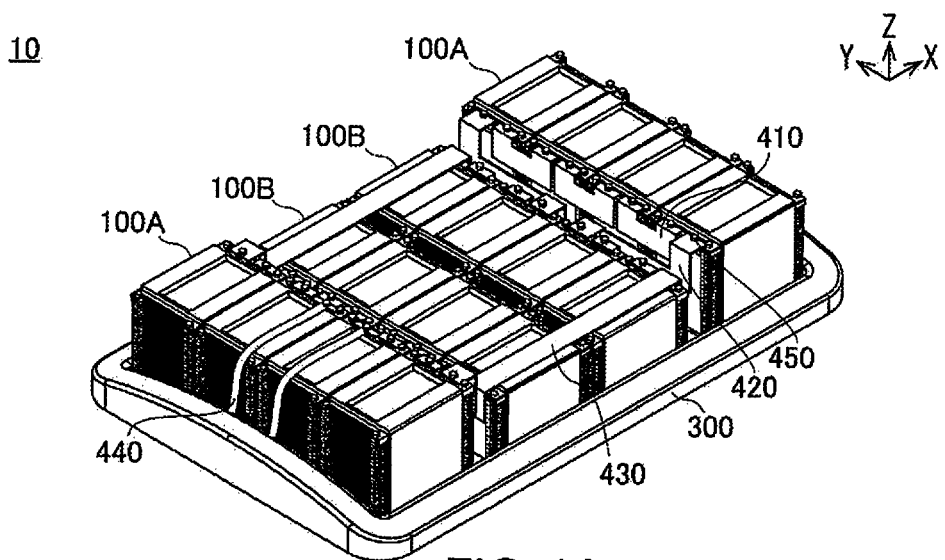
FIG. 1A, FIG. 1B, and FIG. 1C are a perspective view, a plan view, and a front view illustrating the battery pack according to the first embodiment.

Embodiments of the present invention will be explained below, with reference to the appended drawings. In the explanations of the drawings, the same elements are given the same reference symbols, and overlapping explanations are omitted. The sizes and ratios of the members in the drawing are exaggerated for convenience of explanation, and may be different from the actual sizes and ratios. The orientation is shown using arrows indicated by X, Y, and Z in the drawings. The direction of the arrow indicated by X indicates a direction that intersects with the stacking direction of the unit cell 110 and a direction along the longitudinal direction of the unit cell 110. The direction of the arrow indicated by Y indicates a direction that intersects with the stacking direction of the unit cell 110 and a direction along the short side direction of the unit cell 110. The direction of the arrow indicated by Z is the stacking direction of the unit cell 110.

First Embodiment

First, a battery pack 10 according to the first embodiment will be described with reference to FIGS. 1-14.

Figure 1B:
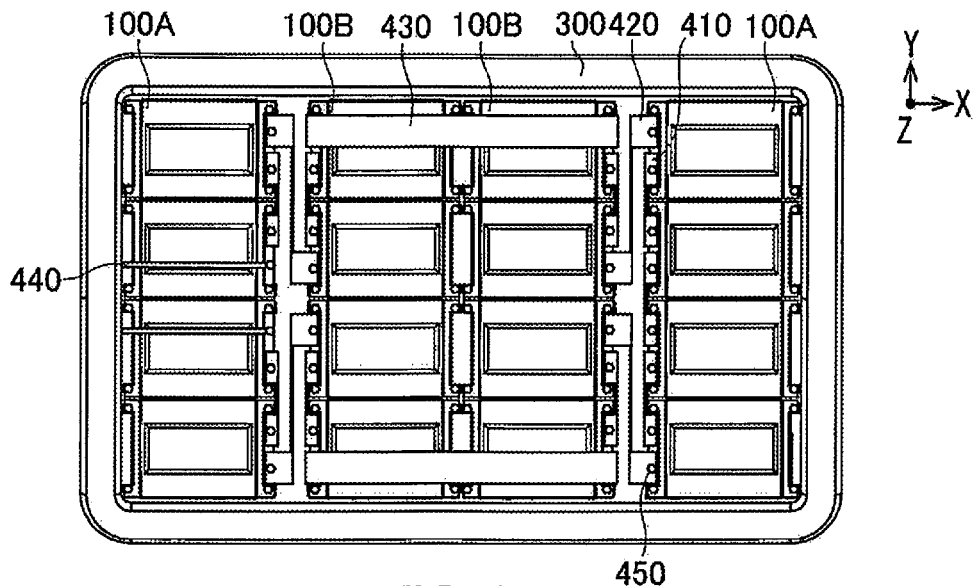
Figure 1C:
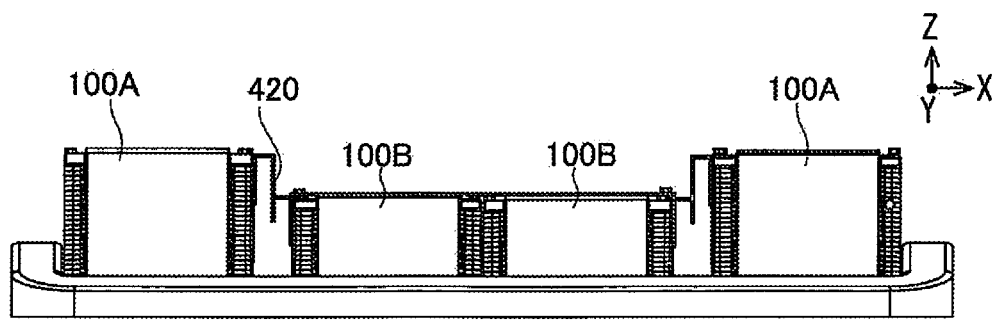
Figure 2:
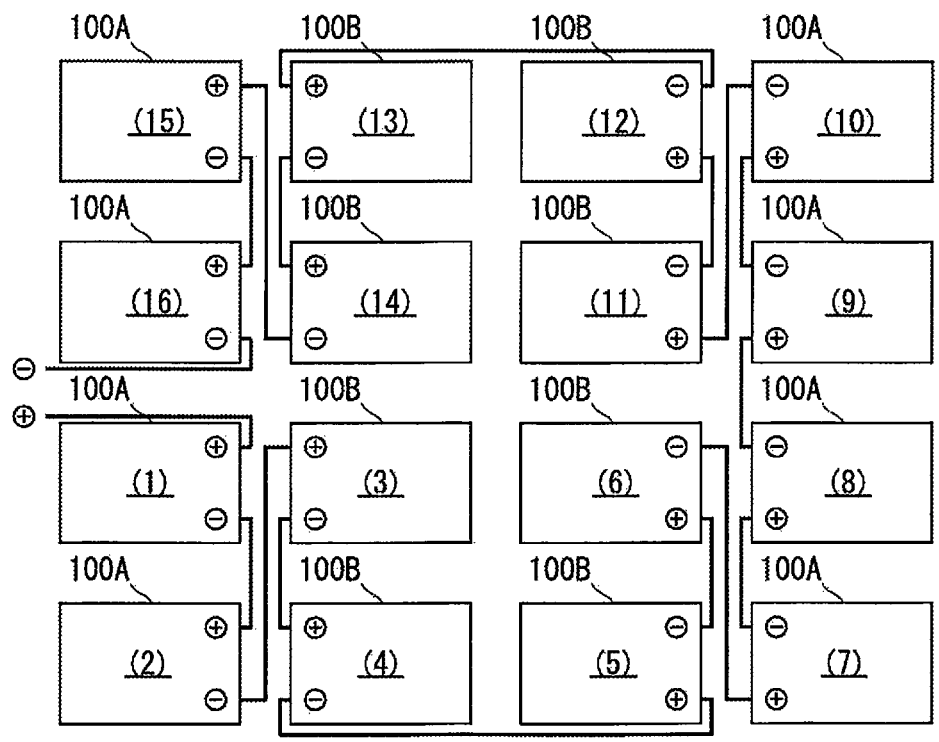
FIG. 2 is a conceptual view illustrating the electrical connection between battery modules in a battery pack.
Figure 3A:
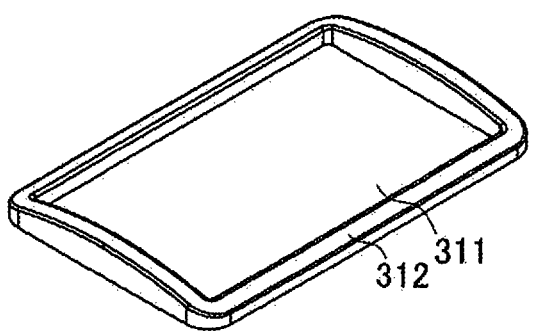
FIG. 3A and FIG. 3B are a perspective view and a plan view illustrating a base member on which the battery modules are mounted.
Figure 3B:
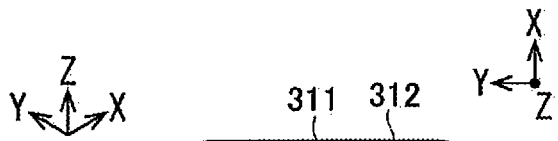
Figure 4:
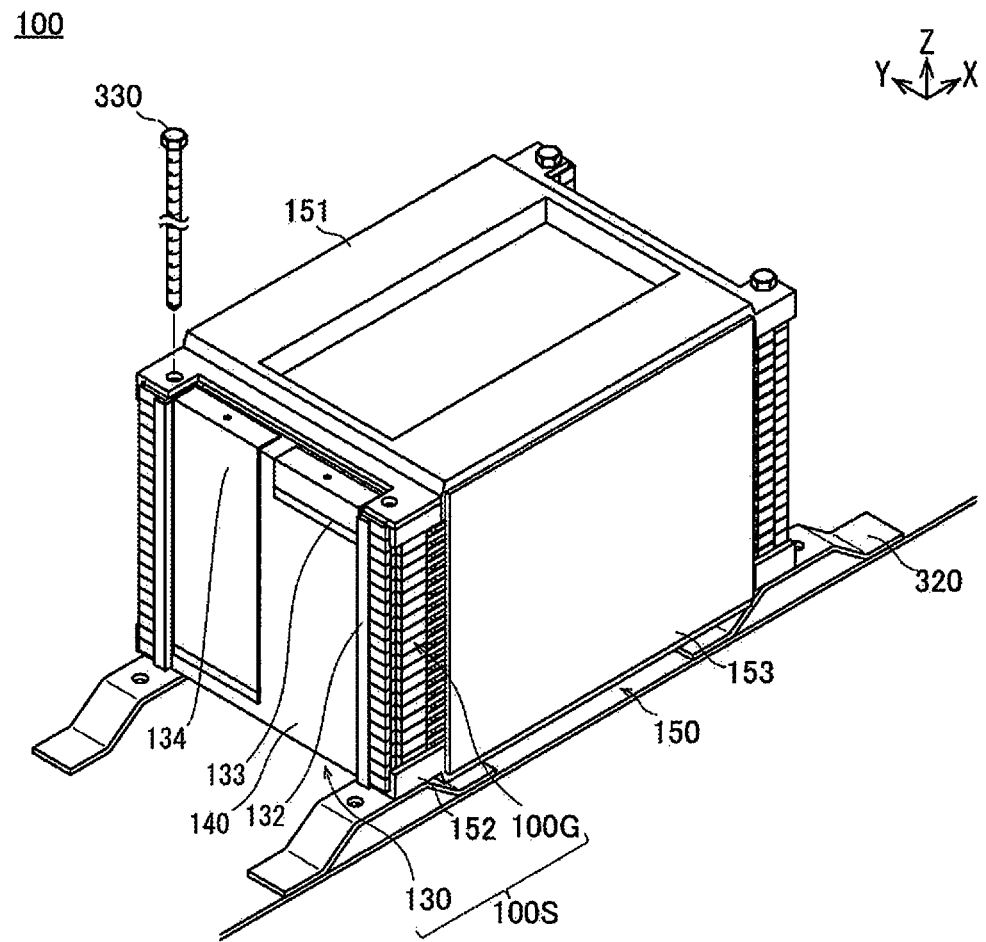
FIG. 4 is a perspective view illustrating battery modules that constitute a battery pack.
Figure 5A:
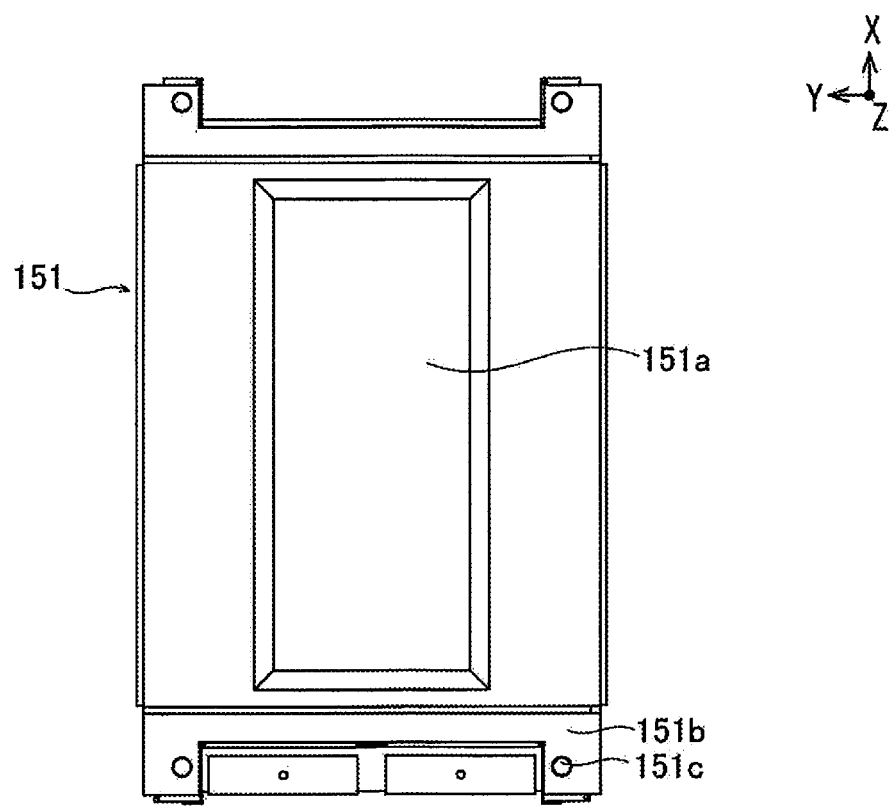
FIG. 5A and FIG. 5B are a plan view and a side view illustrating the battery module of FIG. 4.
Figure 5B:
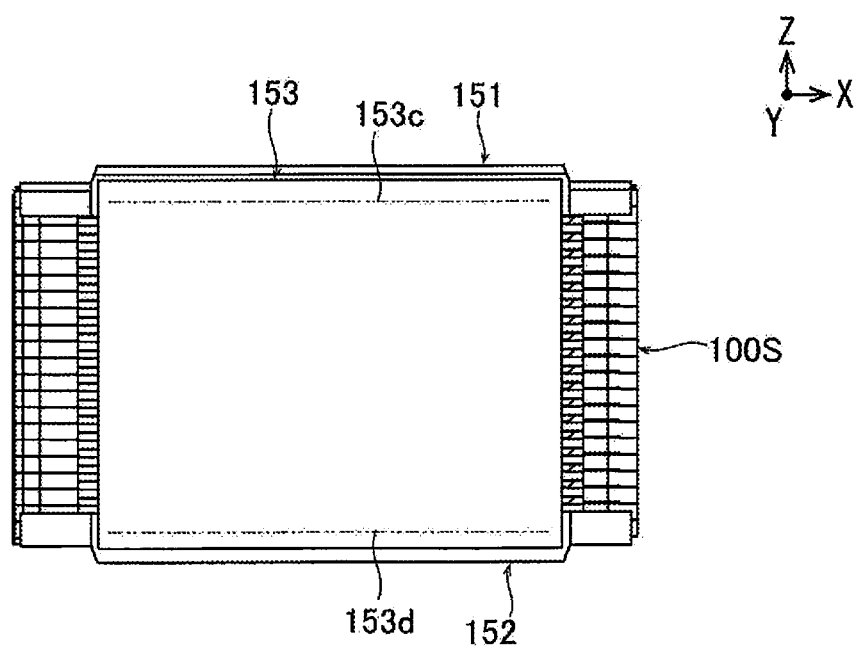
Figure 6:
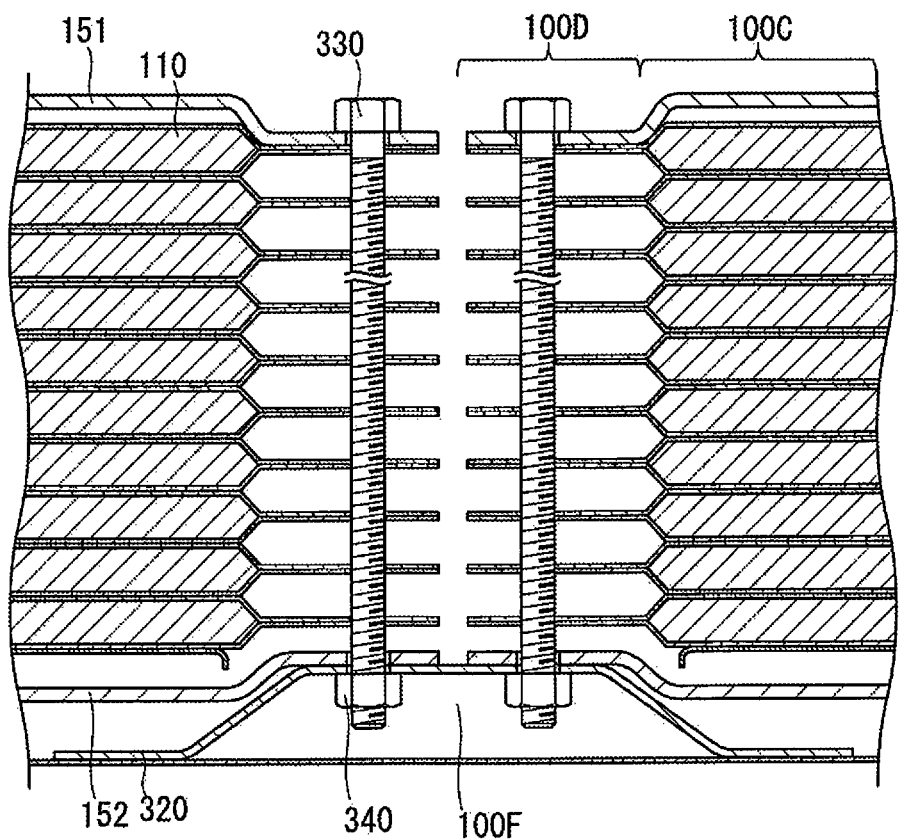
FIG. 6 is a cross-sectional view illustrating a state in which battery modules are mounted on a base portion by means of bolts and brackets.
Figure 7:
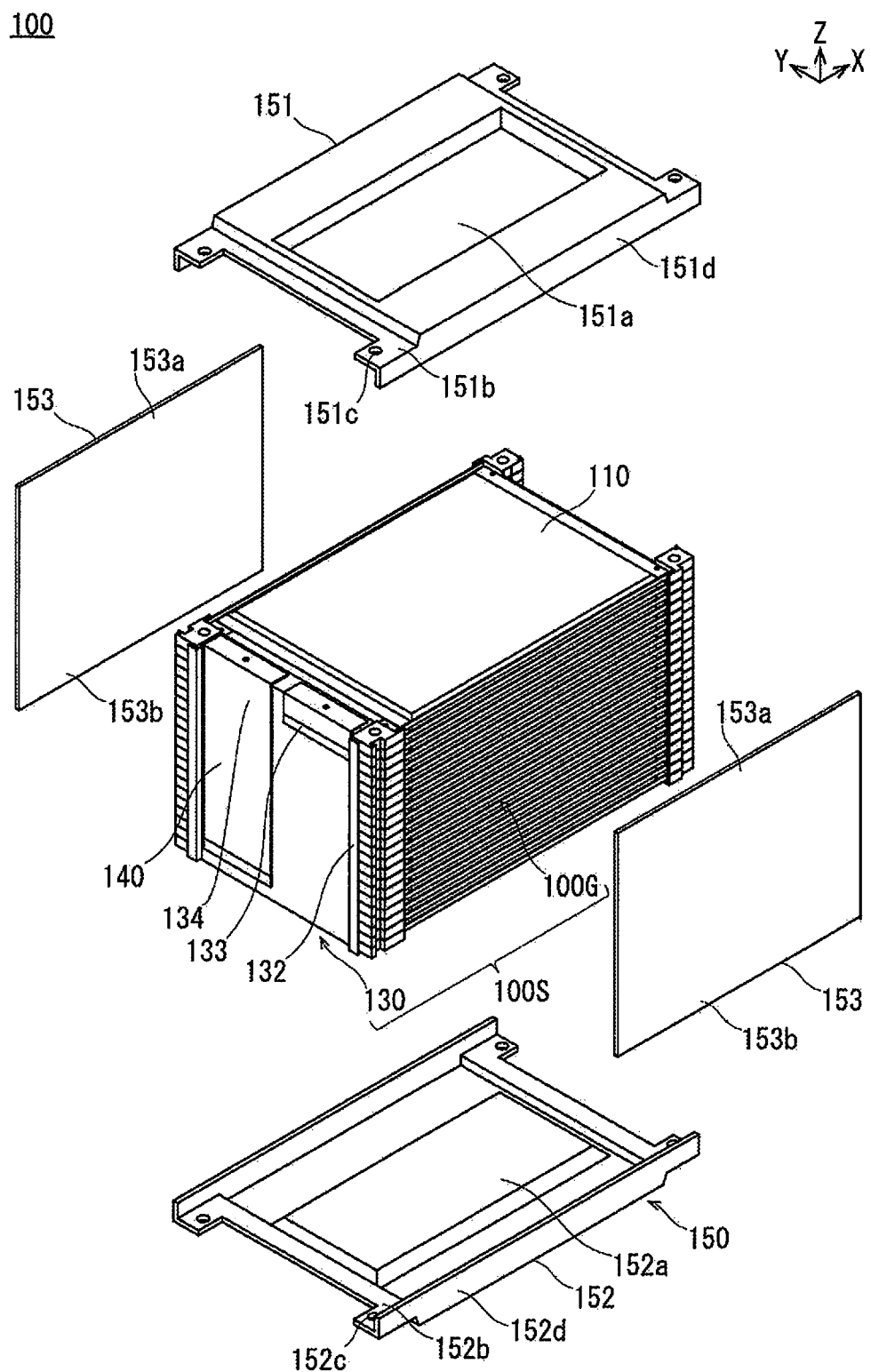
FIG. 7 is a perspective view illustrating a state in which the entire stacked body, in a state in which an upper pressure plate, a lower pressure plate, and left and right side plates are disassembled from a battery module and a protective cover is attached thereto, is exposed.

FIG. 1A, FIG. 1B, and FIG. 1C are a perspective view, a plan view, and a front view illustrating the battery pack according to the first embodiment. FIG. 2 is a conceptual view illustrating the electrical connection between battery modules in a battery pack. FIG. 3A and FIG. 3B are a perspective view and a plan view illustrating a base member on which the battery modules are mounted. FIG. 4 is a perspective view illustrating a plurality of battery modules 100 that constitute a battery pack 10. FIG. 5A and FIG. 5B are a plan view and a side view illustrating the battery module of FIG. 4. FIG. 6 is a cross-sectional view illustrating a state in which battery modules are mounted on a base portion by means of bolts and brackets. FIG. 7 is a perspective view illustrating a state in which the entire stacked body, in a state in which an upper pressure plate, a lower pressure plate, and left and right side plates are disassembled from a battery module and a protective cover is attached thereto, is exposed.

Figure 8:
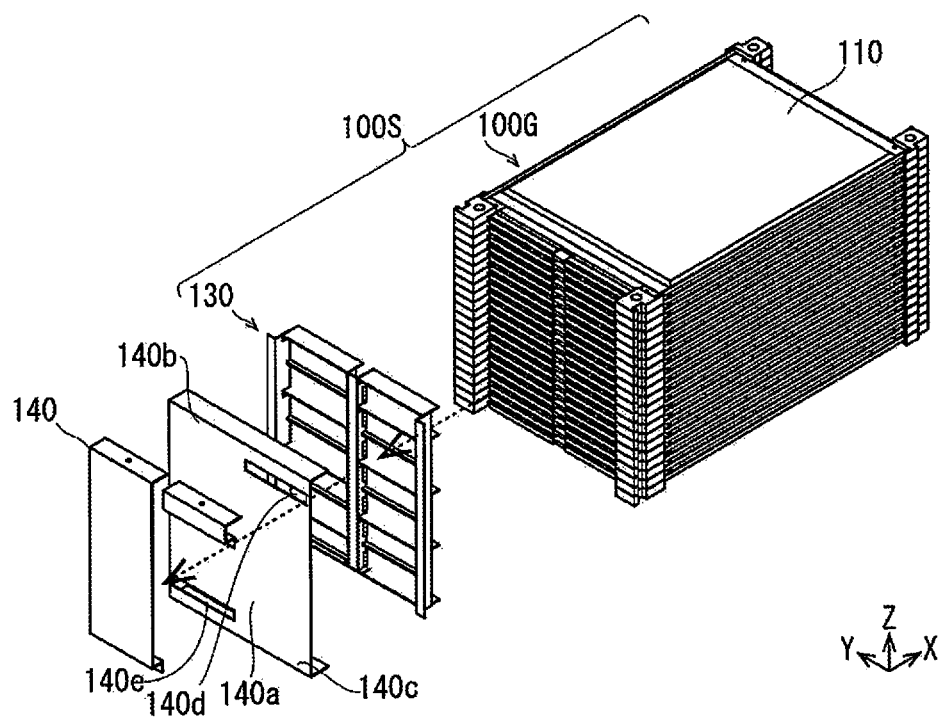
FIG. 8 is a perspective view illustrating a state in which the protective cover is detached from the stacked body illustrated in FIG. 7 and the stacked body is disassembled into a cell group and a bus bar unit.
Figure 9:
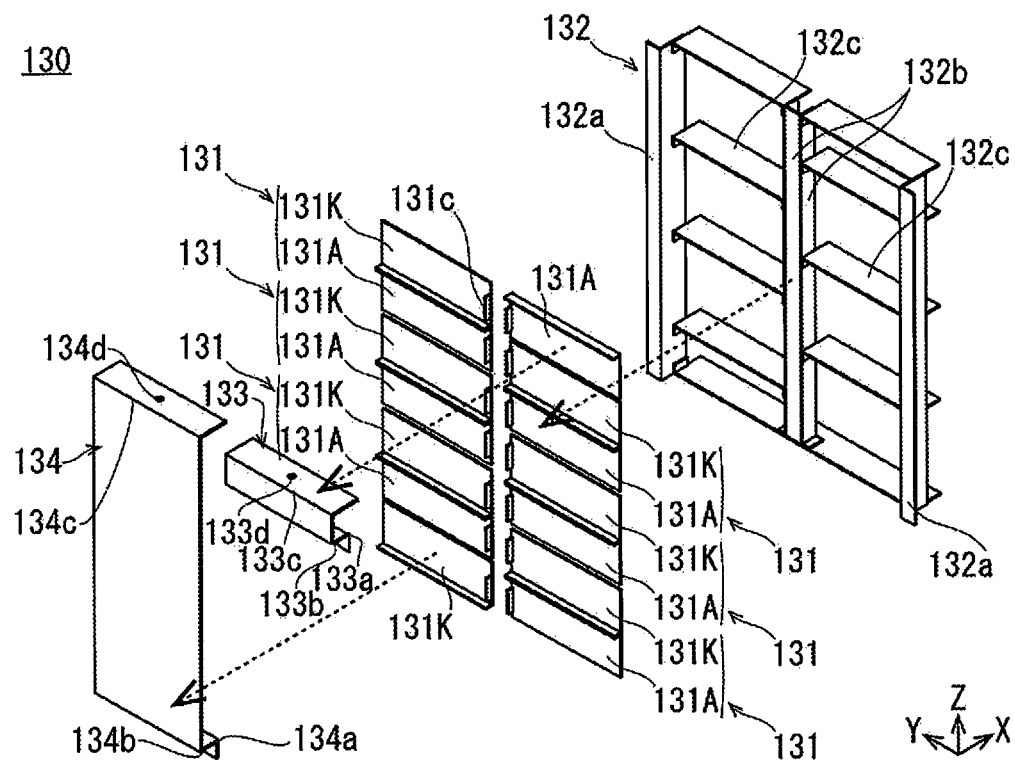
FIG. 9 is an exploded perspective view illustrating the bus bar unit illustrated in FIG. 8.
Figure 10:
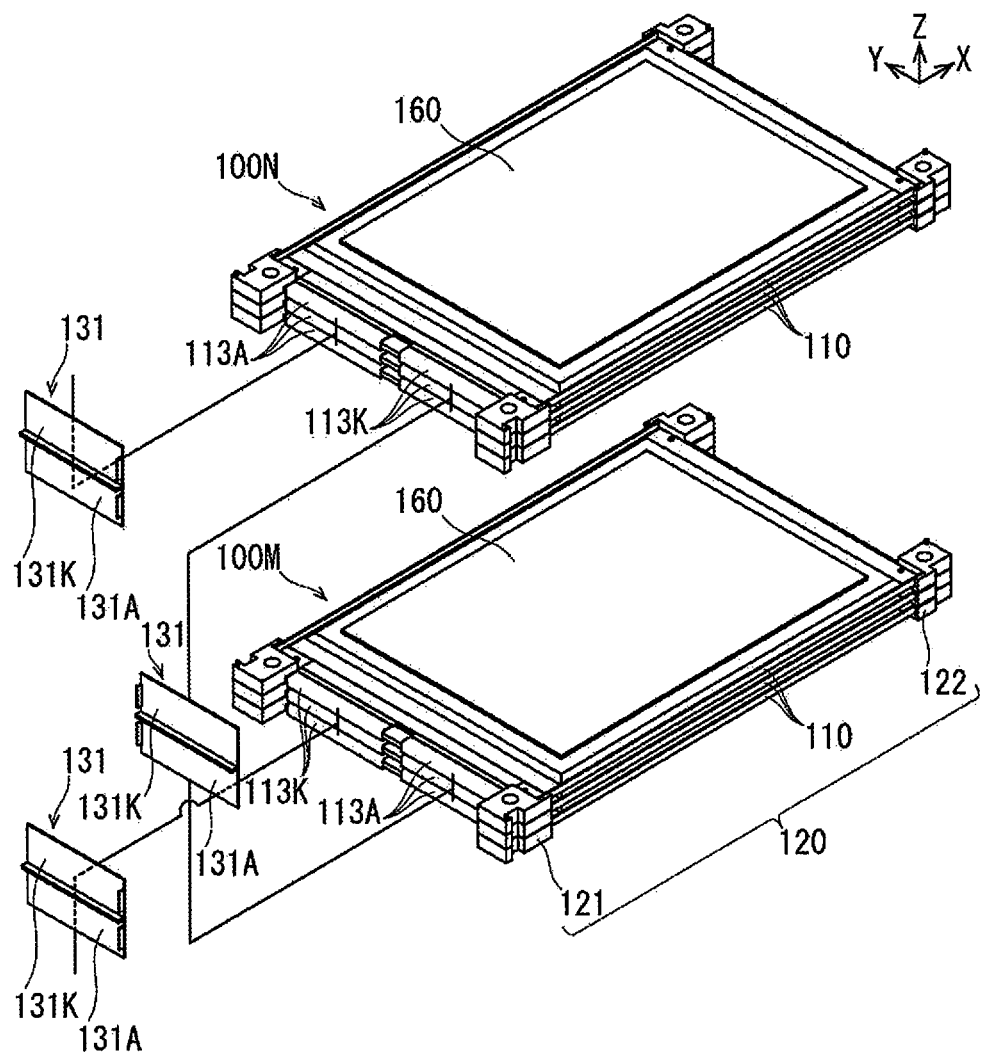
FIG. 10 is an exploded perspective view schematically illustrating a state in which an anode side electrode tab of a first cell sub-assembly (set of three of the unit cells connected in parallel) and a cathode side electrode tab of a second cell sub-assembly (set of three of the unit cells connected in parallel) are joined by means of a bus bar.

FIG. 8 is a perspective view illustrating a state in which the protective cover is detached from the stacked body illustrated in FIG. 7 and the stacked body is disassembled into a cell group and a bus bar unit. FIG. 9 is an exploded perspective view illustrating the bus bar unit illustrated in FIG. 8. FIG. 10 is an exploded perspective view schematically illustrating a state in which an anode side electrode tab of a first cell sub-assembly (set of three of the unit cells connected in parallel) and a cathode side electrode tab of a second cell sub-assembly (set of three of the unit cells connected in parallel) are joined by means of a bus bar.

Figure 11A:
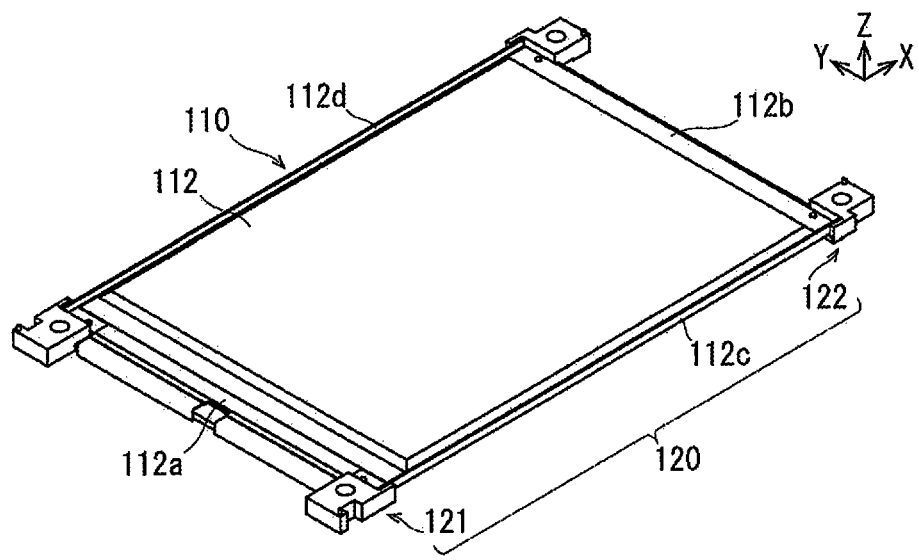
FIG. 11A is a perspective view illustrating a state in which a pair of spacers (first spacer and second spacer) are attached to a unit cell.
Figure 11B:
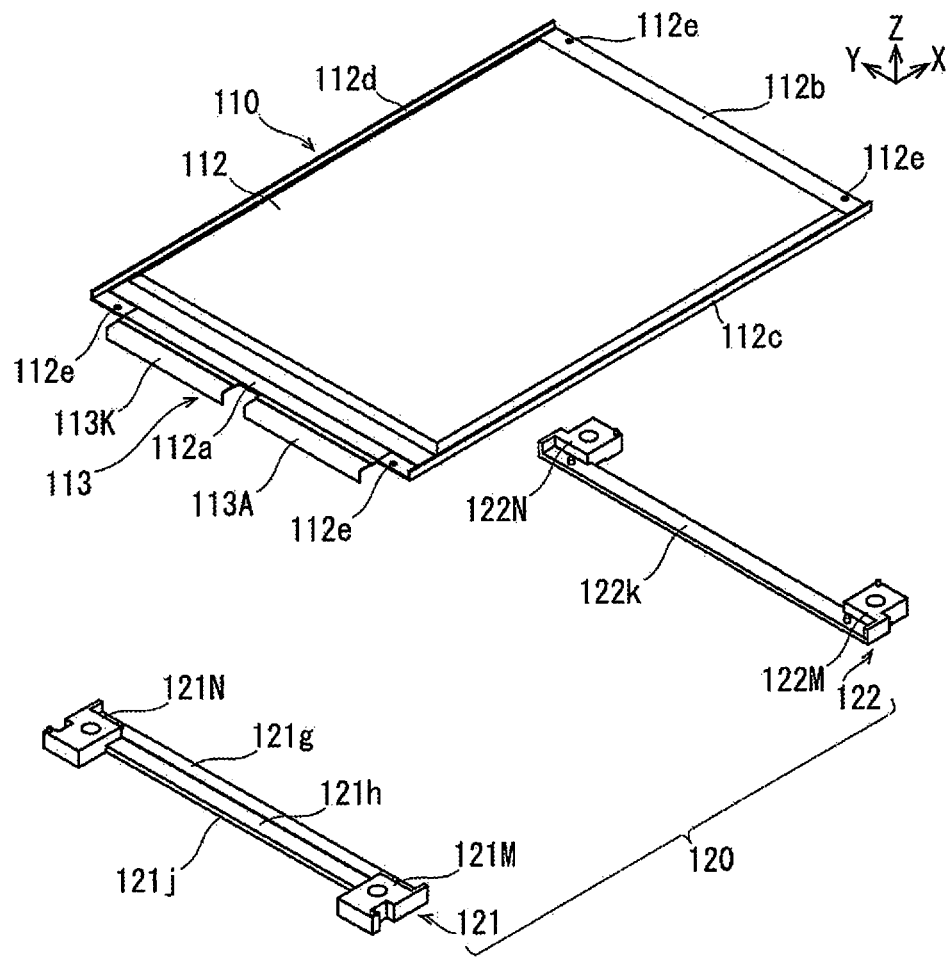
FIG. 11B is a perspective view illustrating a state in which the pair of spacers (first spacer and second spacer) is detached from the unit cell.
Figure 12:
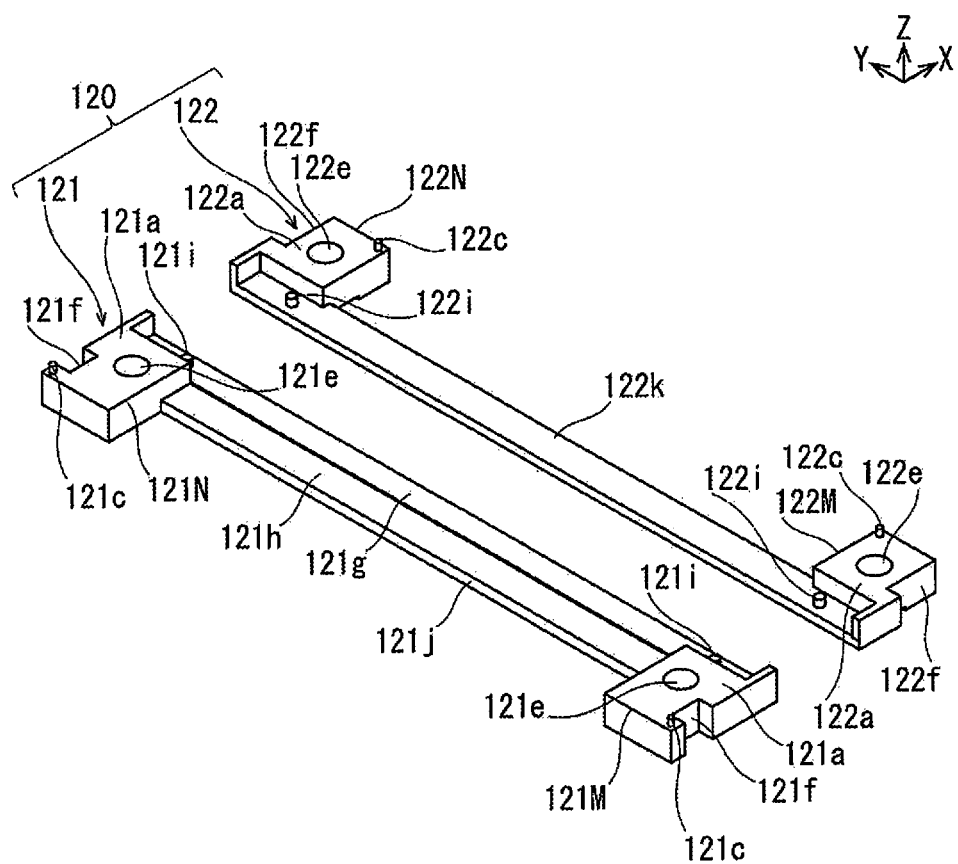
FIG. 12 is a perspective view illustrating the pair of spacers (first spacer and second spacer).
Figure 13A:
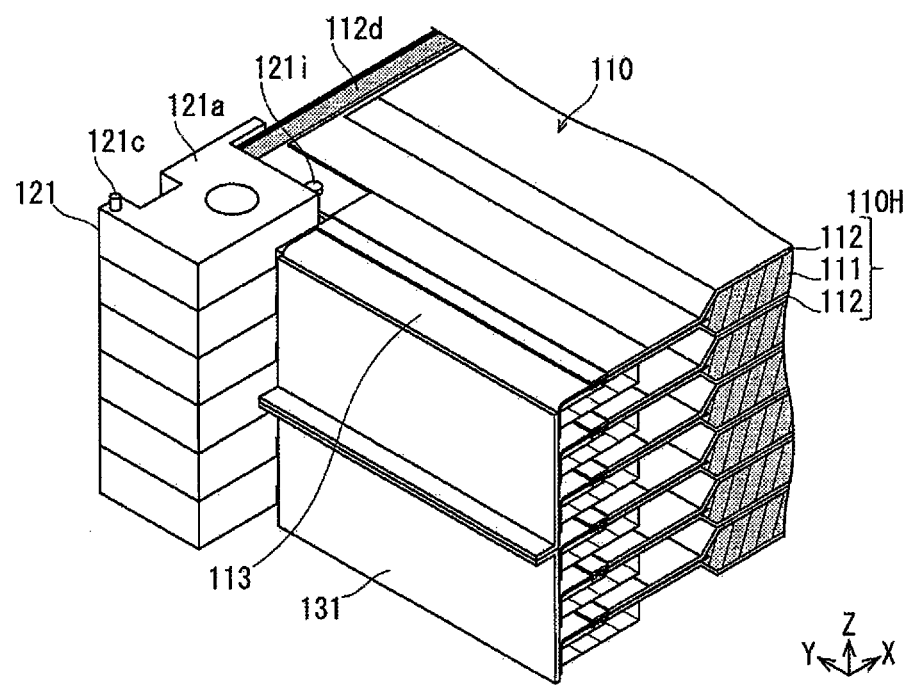
FIG. 13A is a perspective view illustrating a cross-section of the principle part of a state in which a bus bar is joined to the electrode tabs of stacked unit cells.
Figure 13B:
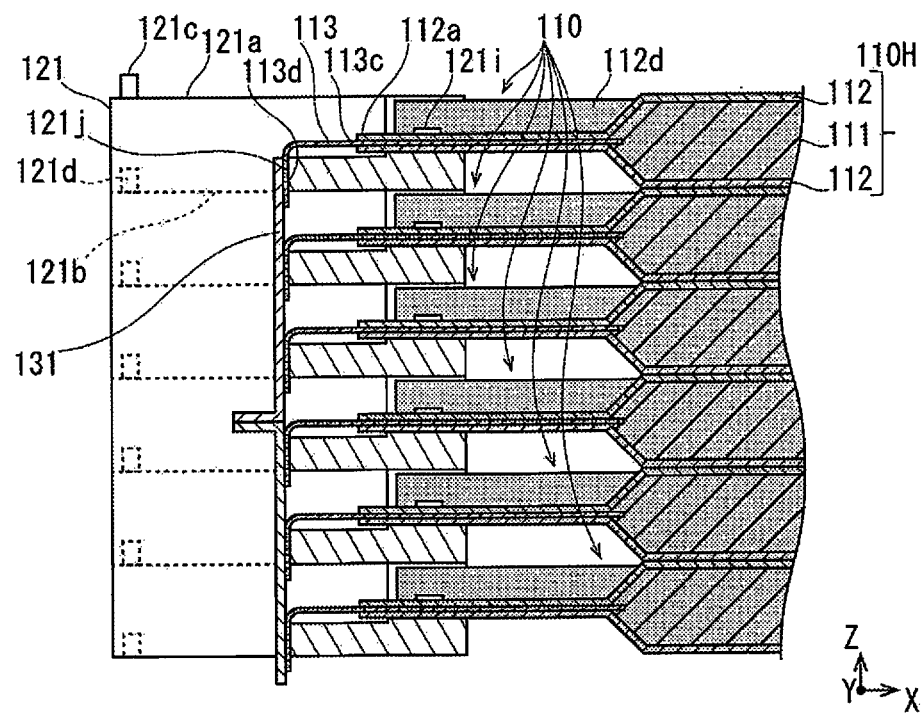
FIG. 13B is a side view illustrating FIG. 13A as viewed from the side.
Figure 14:
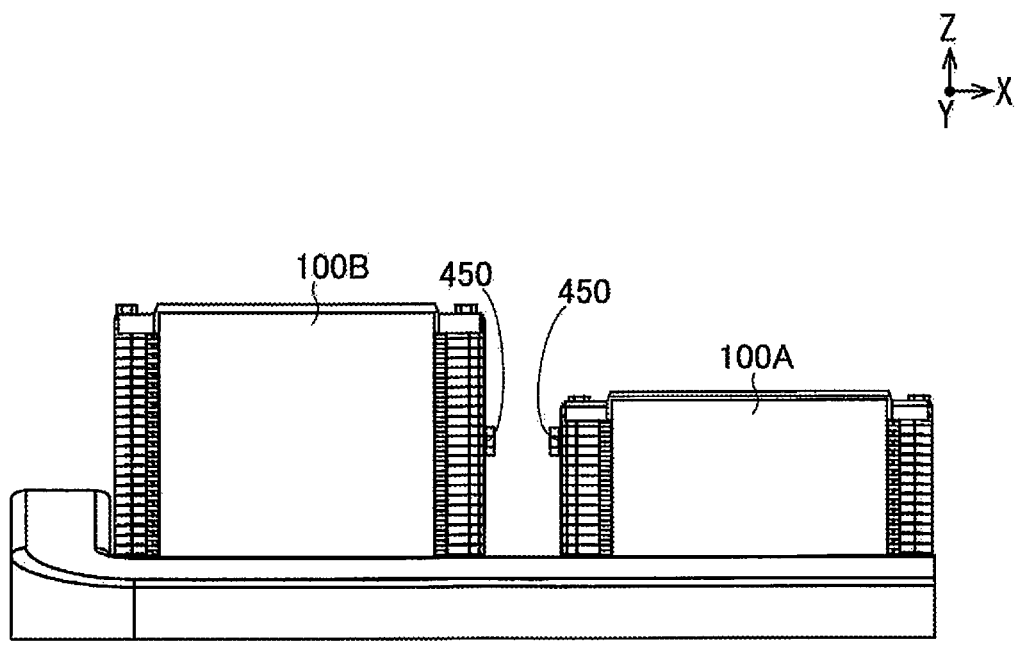
FIG. 14 is a view illustrating a comparative example for describing the attachment position of the inter-module bus bar in the battery module.

FIG. 11A is a perspective view illustrating a state in which a pair of spacers (first spacer and second spacer) is attached to a unit cell, and FIG. 11B is a perspective view illustrating a state in which the pair of spacers (first spacer and second spacer) is detached from the unit cell. FIG. 12 is a perspective view illustrating a pair of spacers (first spacer and second spacer). FIG. 13A is a perspective view illustrating a cross-section of the principle part of a state in which a bus bar is joined to the electrode tabs of stacked unit cells, and FIG. 13B is a side view illustrating FIG. 13A as viewed from the side. FIG. 14 is a view illustrating a comparative example for describing the attachment position of the inter-module bus bar in the battery module.

In the state illustrated in FIG. 1, the left front side is referred to as the "front side" of the entire battery module 100 and of each component part, the right rear side is referred to as the "rear side" of the entire battery module 100 and of each component part, and the right front side and the left rear side are referred to as the left and right "lateral sides" of the entire battery module 100 and of each component part.

Battery Pack

First, the battery pack will be described. To summarize with reference to FIG. 1A-FIG. 1C, FIG. 7, and FIG. 11, the battery pack 10 comprises a plurality of battery modules 100A, 100B that is equipped with a plurality of unit cells 110 that is formed into a flat shape and is stacked in the thickness direction, and also is equipped with an anode side terminal 133 and a cathode side terminal 134 for carrying out the input and output of electric power, and a base member 310 configuring a base portion 300, on which the plurality of battery modules 100A, 100B is mounted. In the battery modules 100A, 100B, the anode side terminal 133 and the cathode side terminal 134 are disposed at an end portion of a side opposite to the base member 310, and the battery modules 100A, 100B are arranged on a mounting portion 311 of the base member 310 along the mounting portion 311. In addition, the battery pack 10 comprises inter-module bus bars 410, 420, 430 that electrically connect adjacent battery modules to each other, and a wiring 440 disposed in the electrical terminal end positions of the plurality of battery modules 100A, 100B, which are electrically connected. In the battery modules 100A, 100B, an upper pressure plate 151 and a lower pressure plate 152 (corresponding to a pair of first cover members) are disposed at an end portion in the stacking direction Z of a cell group 100G in which unit cells 110 are stacked, and side plates 153 (corresponding to a pair of second cover members) are disposed at both ends in the short side direction Y that intersects the stacking direction Z and that intersects a longitudinal direction X in which the electrode tabs 113 protrude.

The battery pack 10 comprises a battery module 100A and a battery module 100B in which the number of stacked layers of unit cells 110 are different. The battery modules 100A, 100B are not stacked on the base member 310 but are disposed on one level. The battery modules 100A, 100B are disposed such that the surfaces on which terminals that carry out the input and output of electric power are positioned facing each other, as illustrated in FIG. 1A and FIG. 1C. On the other hand, battery modules in the same row in FIG. 1B are all configured to face the same direction. The battery module 100A is configured by stacking 27 of the unit cells 110, and the battery module 100B is configured by stacking 21 of the unit cells 110. However, the numbers of stacked layers are provided merely as examples and are not limited thereto. In this manner, since the battery module 100A and the battery module 100B have a different number of stacked layers of the unit cells 110, the specifications of the side plates 153 that cover the cell group 100G from the short side direction Y are different.

Specifically, the battery module 100A has a higher number of stacked layers of the unit cells 110 than the battery module 100B; accordingly, the height of the side plate 153 is configured to be higher in the battery module 100A than in the battery module 100B. On the other hand, the upper pressure plate 151 and the lower pressure plate 152, which cover the cell group 100G from the outer side in the stacking direction Z, are not affected by the number of stacked layers of the unit cells 110. Therefore, the battery module 100A and the battery module 100B can share components. The upper pressure plate 151, the lower pressure plate 152, and the side plate 153 will be described in detail later.

The base portion 300 comprises a base member 310 on which the battery modules 100A, 100B are mounted and brackets 320, bolts 330, and nuts 340, for attaching the battery modules 100A, 100B to the base member 310, as illustrated in FIG. 3, FIG. 4, and FIG. 6. The base member 310 comprises a mounting portion 311 for mounting the battery modules 100A, 100B and a flange portion 312 provided on the outer side of the mounting portion 311, as illustrated in FIG. 3A and FIG. 3B. The mounting portion 311 is formed flat, but it may be a shape other than a flat shape, as long as the battery modules 100A, 100B can be mounted thereon. The flange portion 312 is configured by bending a flat plate material, or the like, so as to be able to attach brackets, for example, when mounting the battery pack 10 on a vehicle.

In addition, the battery modules 100A, 100B comprise stacking portions 100C corresponding to the portion on which the unit cells 110 are stacked, and insertion portions 100D into which bolts 330 for attaching the battery modules 100A, 100B to the base member 310 are inserted, as illustrated in FIG. 6. When viewing the battery module 100A from the front (X direction) or the side (Y direction), the length of the insertion portion 100D in the stacking direction Z is configured to be shorter than that of the stacking portion 100C. Furthermore, a stepped recessed portion 100F is formed from the stacking portion 100C to the insertion portion 100D.

The bracket 320 is prepared for mounting the battery modules 100A, 100B on the base member 310. The bracket 320 is disposed between the battery module 100A or the battery module 100B and the base member 310, fitting the shape of the recessed portion 100F from the stacking portion 100C to the insertion portion 100D of the battery modules 100A, 100B, as illustrated in FIG. 6. Accordingly, the bracket can function as a reinforcing material for the attachment site when attaching the battery modules 100A, 100B to the base member 310. The bracket 320 is joined to the base member 310 by welding in the present embodiment, but it may be joined by a method other than welding, as long as the battery modules 100A, 100B can be mounted.

The bolt 330 is extended through the plurality of unit cells 110 constituting the battery modules 100A, 100B in a direction that intersects with the mounting portion 311 of the base member 310, to attach the battery modules 100A, 100B to the bracket 320, together with the nut 340. Since the bracket 320 is joined to the base member 310, the battery modules 100A, 100B are attached to the base portion 300 by attaching the battery modules 100A, 100B to the bracket 320, as illustrated in FIG. 6. The battery modules 100A, 100B are mounted on the base member 310, in a state in which the unit cells 110 are stacked in the stacking direction Z. The bolt 330 is inserted in the stacking direction of the battery modules 100A, 100B, that is, stacking direction Z in the present embodiment, according to the stacking mode of the unit cells 110; and fastened to the nut 340. In addition, the head portion of the bolt 330 is configured so as not to exceed the upper pressure plate 151 positioned on the upper portion of the stacking portion 100C, as illustrated in FIG. 6.

The inter-module bus bars 410, 420, 430 are used for connecting adjacent battery modules in the battery pack 10, as illustrated in FIG. 1B and FIG. 2. The inter-module bus bar 410 electrically connects battery modules that are adjacent in the same column in FIG. 1B to each other (for example, refer to the battery modules of (1) and (2) in FIG. 2). The inter-module bus bar 420 electrically connects battery modules between adjacent columns and whose positions in the rows are different, i.e., battery modules that are in a so-called oblique positional relationship (for example, refer to the battery modules (2) and (3) in FIG. 2). The inter-module bus bar 430 electrically connects battery modules between adjacent columns and whose positions in the rows are the same (for example, refer to the battery modules (4) and (5) in FIG. 2). In the battery pack 10, the battery modules are electrically connected in the order of (1) to (16) in FIG. 2, by arranging the inter-module bus bars 410, 420, 430, as illustrated in FIG. 1A and FIG. 1B. However, FIG. 2 is merely an example, and no limitation is imposed thereby. In addition, the inter-module bus bars 410, 420, 430 are fastened to the battery modules 100A, 100B by means of bolts 450 on the upper surfaces of the battery modules 100A, 100B. As a result, compared to a case in which the attachment positions of bolts that fasten the inter-module bus bars are located between opposing battery modules, it is possible to use the space in which battery pack components are not present as an operating space, as illustrated in FIG. 14. Therefore, adjacent battery modules can be disposed closer to each other. In addition, the terminal portions of the battery modules 100A, 100B in the longitudinal direction X face each other. Accordingly, the length of the inter-module bus bar 420 can be made relatively short. The wiring 440 is connected to a terminal portion, which is not shown, positioned on the left in FIG. 1B and FIG. 2, and which becomes an outlet for electric power that is generated by the plurality of battery modules 100A, 100B.

Battery Module

Next, the battery module will be described. Here, unless otherwise specified, the battery modules 100A, 100B will be collectively referred to as battery module 100, since only the number of stacked layers of the unit cells 110 and the dimension of the side plate 153 in the stacking direction Z are different. The battery module 100 comprises a stacked body 100S including a cell group 100G formed by stacking a plurality of unit cells 110 having a flat shape in the thickness direction, as illustrated in FIG. 4 and FIG. 7. The battery module 100 further comprises a protective cover 140 attached on the front side of the stacked body 100S and a chassis 150 that houses the stacked body 100S in a state in which each unit cell 110 is pressurized along the stacking direction of the unit cells 110. The stacked body 100S comprises a cell group 100G and a bus bar unit 130 attached to the front side of the cell group 100G and that integrally holds a plurality of bus bars 131, as illustrated in FIG. 8. The protective cover 140 covers and protects the bus bar unit 130. The bus bar unit 130 comprises a plurality of bus bars 131 and a bus bar holder 132 that integrally attaches the plurality of bus bars 131 in a matrix, as illustrated in FIG. 9. Of the plurality of bus bars 131, an anode side terminal 133 is attached to the terminal end on the anode side, and a cathode side terminal 134 is attached to the terminal end on the cathode side.

The cell group 100G is configured by connecting, in series, a first cell sub-assembly 100M comprising three of the unit cells 110 electrically connected in parallel and a second cell sub-assembly 100N comprising three different unit cells 110 electrically connected in parallel, by means of a bus bar 131, as illustrated in FIG. 10.

The first cell sub-assembly 100M and the second cell sub-assembly 100N have the same configuration, excluding the folding directions of the distal end portions 113d of the electrode tabs 113 of the unit cells 110. Specifically, the second cell sub-assembly 100N is one in which the top and bottom of the unit cells 110 included in the first cell sub-assembly 100M are reversed. However, the folding direction of the distal end portions 113d of the electrode tabs 113 of the second cell sub-assembly 100N is aligned on the lower side of the stacking direction Z so as to be the same as the folding direction of the distal end portions 113d of the electrode tabs 113 of the first cell sub-assembly 100M. A pair of spacers 120 (first spacer 121 and second spacer 122) is attached to each of the unit cells 110.

The unit cell 110 corresponds to, for example, a flat lithium ion secondary battery. The unit cell 110 comprises a cell body 110H obtained by sealing a power generation element 111 with a pair of laminate films 112 (corresponding to an external casing), and a thin plate shaped electrode tab 113 that is electrically connected to the power generation element 111 and protruding out from the cell body 110H to the outside, as illustrated in FIG. 13A and FIG. 13B. The laminate film 112 is configured by laminating, for example, polyethylene or nickel.

The power generation element 111 is formed by laminating a plurality of layers in which a positive electrode and a negative electrode are sandwiched by separators. The power generation element 111 is charged by receiving a supply of electric power from the outside, then it supplies electric power to an external electrical device while discharging.

The laminate film 112 is configured by covering both sides of a metal foil with a sheet having an insulating property. The pair of laminate films 112 covers the power generation element 111 from both sides along the stacking direction Z to seal the four sides thereof. In the pair of laminate films 112, an anode side electrode tab 113A and a cathode side electrode tab 113K protrude out from between end portions 112a along the short side direction Y to the outside, as illustrated in FIG. 11B.

In the laminate film 112, a pair of connecting pins 121i of the first spacer 121 is respectively inserted into a pair of connecting holes 112e respectively provided on both ends of the end portion 112a along the short side direction Y, as illustrated in FIG. 11B and FIG. 12. On the other hand, in the laminate film 112, a pair of connecting pins 122i is respectively inserted into a pair of connecting holes 112e respectively provided on both ends of the other end portion 112b along the short side direction Y. In the laminate film 112, two end portions 112c and 112d along the longitudinal direction X are formed bent upward in the stacking direction Z.

The electrode tab 113 is configured from an anode side electrode tab 113A and a cathode side electrode tab 113K, which respectively extend from between the one end portion 112a of a pair of laminate films 112 toward the outside, in a state of being separated from each other, as illustrated in FIG. 11B, FIG. 13A, and FIG. 13B. The anode side electrode tab 113A is made of aluminum, in accordance with the characteristics of the anode side component members in the power generation element 111. The cathode side electrode tab 113K is made of copper, in accordance with the characteristics of the cathode side component members in the power generation element 111.

The electrode tab 113 is formed in an L shape running from a proximal end portion 113c adjacent to the cell body 110H to the distal end portion 113d, as illustrated in FIG. 13A and FIG. 13B. Specifically, the electrode tab 113 extends from the proximal end portion 113c thereof along one side in the longitudinal direction X. On the other hand, the distal end portion 113d of the electrode tab 113 is formed folded downward along the stacking direction Z. The shape of the distal end portion 113d of the electrode tab 113 is not limited to an L shape. The distal end portion 113d of the electrode tab 113 is formed in a planar shape so as to face the bus bar 131. The electrode tab 113 may be formed in a U shape by further extending the distal end portion 113d and by folding the extended portion along the proximal end portion 113c on the cell body 110H side. On the other hand, the proximal end portion 113C of the electrode tab 113 may be formed in a wave shape or a curved shape. In addition, the surface of the electrode tab 113 is disposed on the same side as the surfaces of the anode side terminal 133 and the cathode side terminal 134.

In the plurality of stacked unit cells 110, the distal end portion 113d of each electrode tab 113 is aligned and folded downward in the stacking direction Z, as illustrated in FIG. 13B. Here, in the battery module 100, three of the unit cells 110 electrically connected in parallel (first cell sub-assembly 100M) and three different unit cells 110 electrically connected in parallel (second cell sub-assembly 100N) are connected in series, as illustrated in FIG. 10. Therefore, the top and bottom of the unit cells 110 are interchanged every three of the unit cells 110, such that the positions of the anode side electrode tabs 113A and the cathode side electrode tabs 113K of the unit cells 110 crisscross along the stacking direction Z.

However, if the top and bottom are simply interchanged every three of the unit cells 110, the positions of the distal end portions 113d of the electrode tabs 113 will vary in the vertical direction along the stacking direction Z; therefore, all of the distal end portions 113d of the electrode tabs 113 of the unit cells 110 are adjusted and folded so that the positions thereof will be aligned.

In the first cell sub-assembly 100M illustrated in the lower part of FIG. 10, the anode side electrode tab 113A is disposed on the right side of the drawing and the cathode side electrode tab 113K is disposed on the left side of the drawing. On the other hand, in the second cell sub-assembly 100N illustrated in the upper part of FIG. 10, the cathode side electrode tab 113K is disposed on the right side of the drawing and the anode side electrode tab 113A is disposed on the left side of the drawing.

In this manner, even if the arrangement of the anode side electrode tab 113A and the cathode side electrode tab 113K is different, the distal end portion 113d of the electrode tab 113 of the unit cell 110 is folded downward along the stacking direction Z. In addition, the distal end portions 113d of the electrode tabs 113 are arranged on the same side of the stacked body 100S, as illustrated in FIG. 13B. A double-sided tape 160 that is joined to a stacking member to be stacked above is adhered to the unit cells 110 positioned on the upper surfaces of the first cell sub-assembly 100M and the second cell sub-assembly 100N.

A pair of spacers 120 (first spacer 121 and second spacer 122) are disposed between stacked unit cells 110, as illustrated in FIGS. 13A, 13B, and the like. The first spacer 121 is disposed along one end portion 112a of the laminate film 112 where the electrode tab 113 of the unit cell 110 protrudes, as illustrated in FIG. 11A. The second spacer 122 is disposed along the other end portion 112b of the laminate film 112, as illustrated in FIG. 11A. The second spacer 122 has a configuration in which the shape of the first spacer 121 is simplified. A plurality of the unit cells 110 is stacked in the stacking direction Z, after attaching a pair of spacers 120 (first spacer 121 and second spacer 122) to each. The pair of spacers 120 (first spacer 121 and second spacer 122) are made of reinforced plastics having insulating properties. Below, after describing the configuration of the first spacer 121, the configuration of the second spacer 122 will be described while comparing with the configuration of the first spacer 121.

The first spacer 121 is formed in a rectangular parallelepiped shape, elongated along the short side direction Y, as illustrated in FIG. 11B and FIG. 12. The first spacer 121 is provided with placing portions 121M and 121N on the two ends in the longitudinal direction thereof (short side direction Y).

When the first spacer 121 is stacked in a state of being attached to a unit cell 110, the upper surfaces 121a of the placing portions 121M and 121N of one first spacer 121 and the lower surfaces 121b of the placing portions 121M and 121N of another first spacer 121 disposed above the first spacer 121 come in contact, as illustrated in FIG. 13B.

In the first spacer 121, in order to relatively position the plurality of unit cells 110 to be stacked, a positioning pin 121c provided on the upper surface 121a of one first spacer 121 is fitted with a positioning hole 121d that is opened on the lower surface 121b of another first spacer 121 and that corresponds to the position of the positioning pin 121c, as illustrated in FIG. 12 and FIG. 13B.

In the first spacer 121, a locating hole 121e for inserting a bolt that connects a plurality of unit cells 110 to each other along the stacking direction Z is opened in each of the placing portions 121M and 121N along the stacking direction Z, as illustrated in FIG. 12.

The first spacer 121 is formed such that the region between the placing portions 121M and 121N is notched from the upper side of the stacking direction Z, as illustrated in FIG. 11B and FIG. 12. The notched portion is provided with a first supporting surface 121g and a second supporting surface 121h along the longitudinal direction of the first spacer 121 (short side direction Y of the unit cell 110). The first supporting surface 121g is formed higher along the stacking direction Z and positioned further on the unit cell 110 side than the second supporting surface 121h.

The first spacer 121 carries and supports the one end portion 112a of the laminate film 112, in which the electrode tab 113 is protruded, with the first supporting surface 121g, as illustrated in FIG. 10B. The first spacer 121 is provided with a pair of connecting pins 121i protruding upward from both ends of the first supporting surface 121g.

The first spacer 121 is provided with a supporting portion 121j, which abuts the electrode tab 113 from the opposite side of the bus bar 131 and supports the distal end portion 113d of the electrode tab 113 of the unit cell 110, on the side surface adjacent to the second supporting surface 121h along the stacking direction Z, as illustrated in FIG. 11B and FIG. 12. The supporting portion 121j of the first spacer 121 sandwiches the distal end portion 113d of the electrode tab 113 together with the bus bar 131 such that the distal end portion 113d and the bus bar 131 are sufficiently abutting each other.

The second spacer 122 has a configuration in which the shape of the first spacer 121 is simplified, as illustrated in FIG. 11B and FIG. 12. The second spacer 122 corresponds to a configuration in which a portion of the first spacer 121 is removed along the short side direction Y of the unit cell 110. Specifically, the second spacer 122 is configured by replacing the second supporting surface 121h and the first supporting surface 121g of the first spacer 121 with a supporting surface 122k. Specifically, the second spacer 122 is provided with placing portions 122M and 122N, in the same manner as the first spacer 121. The second spacer 122 is provided with the supporting surface 122k in the portion where the region between the placing portions 122M and 122N is notched from the upper side of the stacking direction Z. The supporting surface 122k carries and supports the other end portion 112b of the laminate film 112. The second spacer 122 is provided with a positioning pin 122c, a positioning hole, a locating hole 122e, and a connecting pin 122i, in the same manner as the first spacer 121.

The bus bar unit 130 is integrally provided with a plurality of bus bars 131, as illustrated in FIG. 8 and FIG. 9. The bus bar 131 is made of a metal having electrical conductivity, and it electrically connects the distal end portions 113d of the electrode tabs 113 of different unit cells 110 to each other. The bus bar 131 is formed in a flat plate shape and is erected along the stacking direction Z.

The bus bar 131 is integrally formed by joining an anode side bus bar 131A that is laser-welded to an anode side electrode tab 113A of one unit cell 110, and a cathode side bus bar 131K that is laser-welded to a cathode side electrode tab 113K of another unit cell 110 adjacent along the stacking direction Z.

The anode side bus bar 131A and the cathode side bus bar 131K have the same shape and are respectively formed in an L shape, as illustrated in FIG. 9 and FIG. 10. The anode side bus bar 131A and the cathode side bus bar 131K are superimposed with the top and bottom inverted. Specifically, the bus bar 131 is integrated by joining the folded portion of one end portion of the anode side bus bar 131A along the stacking direction Z and the folded portion of one end portion of the cathode side bus bar 131K along the stacking direction Z. The anode side bus bar 131A and the cathode side bus bar 131K are provided with side portions 131c on one end in the short side direction Y along the longitudinal direction X, as illustrated in FIG. 9. The side portions 131c are joined to the bus bar holder 132.

The anode side bus bar 131A is made of aluminum, in the same manner as the anode side electrode tab 113A. The cathode side bus bar 131K is made of copper, in the same manner as the cathode side electrode tab 113K. The anode side bus bar 131A and the cathode side bus bar 131K made of different metals are joined to each other by ultrasonic joining.

For example, if the battery module 100 is configured by connecting, in series, a plurality of sets of three of the unit cells 110 connected in parallel, as illustrated in FIG. 9, the anode side bus bar 131A portion of the bus bar 131 is laser-welded to the anode side electrode tabs 113A of three of the unit cells 110 that are adjacent to each other along the stacking direction Z. In the same manner, the cathode side bus bar 131K portion of the bus bar 131 is laser-welded to the cathode side electrode tabs 113K of three of the unit cells 110 that are adjacent to each other along the stacking direction Z.

However, of the bus bars 131 arranged in a matrix shape, the bus bar 131 positioned on the upper right in the drawing in FIG. 8 and FIG. 9 corresponds to the anode side terminal ends of 21 of the unit cells 110 (3 parallel 7 series) and is configured only from an anode side bus bar 131A. This anode side bus bar 131A is laser-welded to the anode side electrode tabs 113A of the three uppermost unit cells 110 of the cell group 100G. In the same manner, among the bus bars 131 arranged in a matrix shape, the bus bar 131 positioned on the lower left in the drawing in FIG. 8 and FIG. 9 corresponds to the cathode side terminal ends of 21 of the unit cells 110 (3 parallel 7 series), and is configured only from a cathode side bus bar 131K. This cathode side bus bar 131K is laser-welded to the cathode side electrode tabs 113K of the three lowermost unit cells 110 of the cell group 100G.

The bus bar holder 132 integrally holds a plurality of bus bars 131 in a matrix so as to face the electrode tab 113 of each of a plurality of stacked unit cells 110, as illustrated in FIG. 9. The bus bar holder 132 is made of resin having insulating properties and is formed in a frame shape.

The bus bar holder 132 is respectively provided with a pair of columnar support portions 132a erected along the stacking direction Z, so as to be positioned on both sides of the longitudinal direction of the first spacer 121 that support the electrode tabs 113 of the unit cells 110, as illustrated in FIG. 9. The pair of columnar support portions 132a are fitted to the side surfaces of the placing portions 121M and 121N of the first spacer 121. The pair of columnar support portions 132a have an L shape when viewed along the stacking direction Z and are formed in a plate shape extended along the stacking direction Z. The bus bar holder 132 is provided with a pair of auxiliary columnar support portions 132b at an interval, erected along the stacking direction Z so as to be positioned in the vicinity of the center of the first spacer 121 in the longitudinal direction. The pair of auxiliary columnar support portions 132b are formed in a plate shape extended along the stacking direction Z.

The bus bar holder 132 comprises insulating portions 132c that respectively protrude between adjacent bus bars 131 along the stacking direction Z, as illustrated in FIG. 9. The insulating portions 132c are formed in a plate shape extended along the short side direction Y. Each of the insulating portions 132c is provided horizontally between the columnar support portion 132a and the auxiliary columnar support portion 132b. The insulating portion 132c prevents discharge by insulating the space between bus bars 131 of the unit cells 110 that are adjacent to each other along the stacking direction Z.

The bus bar holder 132 may be configured by joining the columnar support portion 132a, the auxiliary columnar support portion 132b, and the insulating portion 132c, which are independently formed, or be configured by integrally molding the columnar support portion 132a, the auxiliary columnar support portion 132b, and the insulating portion 132c.

The anode side terminal 133 corresponds to the anode side terminal end of the cell group 100G configured by alternately stacking the first cell sub-assembly 100M and the second cell sub-assembly 100N, as illustrated in FIG. 7 and FIG. 9.

The anode side terminal 133 is joined to the anode side bus bar 131A positioned on the upper right in the drawing, from among the bus bars 131 arranged in a matrix, as illustrated in FIG. 9. The anode side terminal 133 is made of a metal plate having electrical conductivity, and, when viewed in plan view along the short side direction Y, it has a shape in which a flat plate shaped member is folded at folding points 133a, 133b, 133c at substantially 90 degrees or in an L shape. The surface from the folding point 133a to the end portion is laser-welded to the anode side bus bar 131A. The surface from the folding point 133c to the end portion faces the upper surface of the battery module 100 and connects any one of the inter-module bus bars 410, 420, 430, and is provided with a hole 133d (including the screw groove) opened in the center thereof. A bolt 450 is attached to the hole 133d to connect any one of the inter-module bus bars 410, 420, 430.

The cathode side terminal 134 corresponds to the cathode side terminal end of the cell group 100G configured by alternately stacking the first cell sub-assembly 100M and the second cell sub-assembly 100N, as illustrated in FIG. 9. The cathode side terminal 134 is joined to the cathode side bus bar 131K positioned on the lower left in the drawing, from among the bus bars 131 arranged in a matrix, as illustrated in FIG. 9. The cathode side terminal 134 is configured to be capable of connecting any one of the inter-module bus bars 410, 420, 430 on the upper surface of the battery module 100, in the same manner as the anode side terminal 133. In the cathode side terminal 134, folding points 134a, 134b, 134c are formed, in which a flat plate material is folded at substantially 90 degrees or in an L shape in the same manner as the anode side terminal 133, as illustrated in FIG. 9. The surface below the folding point 134a is joined to the cathode side bus bar 131K by means of a laser, or the like. The surface from the folding point 134c to the end portion is provided with a hole 134d (including the screw groove) opened in the center thereof, in the same manner as the anode side terminal 133. Any one of the inter-module bus bars 410, 420, 430 is connected to the hole 134d.

The protective cover 140 prevents the bus bars 131 from short-circuiting with each other and from coming in contact with an external member and being short-circuited or causing electrical leakage, by covering the bus bar unit 130, as illustrated in FIG. 7 and FIG. 8. Furthermore, the protective cover 140 exposes the anode side terminal 133 and the cathode side terminal 134 to the outside and causes the power generation element 111 of each unit cell 110 to charge and discharge. The protective cover 140 is made of plastics having insulating properties.

The protective cover 140 is formed in a flat plate shape and is erected along the stacking direction Z, as illustrated in FIG. 8. The protective cover 140 has a shape in which the upper end 140b and the lower end 140c of the side surface 140a thereof are folded along the longitudinal direction X and is fitted to the bus bar unit 130.

The side surface 140a of the protective cover 140 is provided with a first opening 140d formed of a rectangular hole that is slightly larger than the anode side terminal 133, in order to join the anode side terminal 133 provided to the bus bar unit 130 to the anode side bus bar 131A, as illustrated in FIG. 8. In the same manner, the side surface 140a of the protective cover 140 is provided with a second opening 140e formed of a rectangular hole that is slightly larger than the cathode side terminal 134, in order to join the cathode side terminal 134 provided on the bus bar unit 130 to the cathode side bus bar 131K.

The chassis 150 houses the cell group 100G in a state of being pressurized along the stacking direction Z, as illustrated in FIG. 4 and FIG. 5B. An appropriate surface pressure is imparted to the power generation element 111 by sandwiching and pressurizing the power generation element 111 of each unit cell 110 provided on the cell group 100G with the upper pressure plate 151 and the lower pressure plate 152. In other words, the height of the cell group 100G in the battery module 100 is configured to be lower than the height when the same number of unit cells 110 as that of the cell group 100G is stacked in a non-loaded state by means of the upper pressure plate 151 and the lower pressure plate 152.

The upper pressure plate 151 is disposed above the cell group 100G along the stacking direction Z, as illustrated in FIG. 4 and FIG. 7. The upper pressure plate 151 is provided with a pressing surface 151a protruding downward along the stacking direction Z in the center thereof. The power generation element 111 of each unit cell 110 is pressed downward by the pressing surface 151a. The upper pressure plate 151 is provided with a holding portion 151b extended along the longitudinal direction X from both sides along the short side direction Y. The holding portion 151b covers the placing portions 121M and 121N of the first spacer 121 or the placing portions 122M and 122N of the second spacer 122. A locating hole 151c, which communicates with the positioning hole 121d of the first spacer 121 or the positioning hole 122d of the second spacer 122 along the stacking direction Z, is opened in the center of the holding portion 151b. A bolt 330 that connects unit cells 110 with each other is inserted into the locating hole 151c. The upper pressure plate 151 is made of a metal plate having a sufficient thickness. In addition, the upper pressure plate 151 comprises a bent portion 151d formed by bending both ends in the short side direction Y that intersects the stacking direction Z, as a joint portion with the side plate 153, as illustrated in FIG. 7.

The lower pressure plate 152 has the same configuration as the upper pressure plate 151 and is formed by reversing the top and bottom of the upper pressure plate 151, as illustrated in FIG. 4 and FIG. 7. The lower pressure plate 152 is disposed below the cell group 100G along the stacking direction Z. The lower pressure plate 152 presses the power generation element 111 of each unit cell 110 upward with the pressing surface 152a protruding upward along the stacking direction Z. In addition, the lower pressure plate 152 comprises a bent portion 152d formed by bending both ends in the short side direction Y that intersects the stacking direction Z, as a joint portion with the side plate 153, as illustrated in FIG. 7.

One pair of side plates 153 fixes the relative positions of the upper pressure plate 151 and the lower pressure plate 152 such that the upper pressure plate 151 and the lower pressure plate 152, which sandwich and press the cell group 100G from above and below in the stacking direction Z, are not separated from each other, as illustrated in FIG. 4 and FIG. 7. The side plate 153 is made of a rectangular metal plate and is erected along the stacking direction Z. The pair of side plates 153 is disposed outward of the bent portion 151d of the upper pressure plate 151 and the bent portion 152d of the lower pressure plate 152, as illustrated in FIG. 4. The pair of side plates 153 is joined to the upper pressure plate 151 and the lower pressure plate 152 from both sides in the short side direction Y of the cell group 100G by laser welding. In each of the side plates 153, a linear welding portion 153c (corresponding to the joint portion) is formed by seam welding, or the like, at the upper end 153a portion that abuts the upper pressure plate 151 along the longitudinal direction X, as illustrated in FIG. 5B. In the same manner, in each of the side plates 153, a linear welding portion 153d (corresponding to the joint portion) is formed by seam welding, or the like, at the lower end 153b portion that abuts the lower pressure plate 152 along the longitudinal direction X. The pair of side plates 153 covers and protects both sides of the cell group 100G in the short side direction Y.

Method of Producing the Battery Pack

Figure 15:
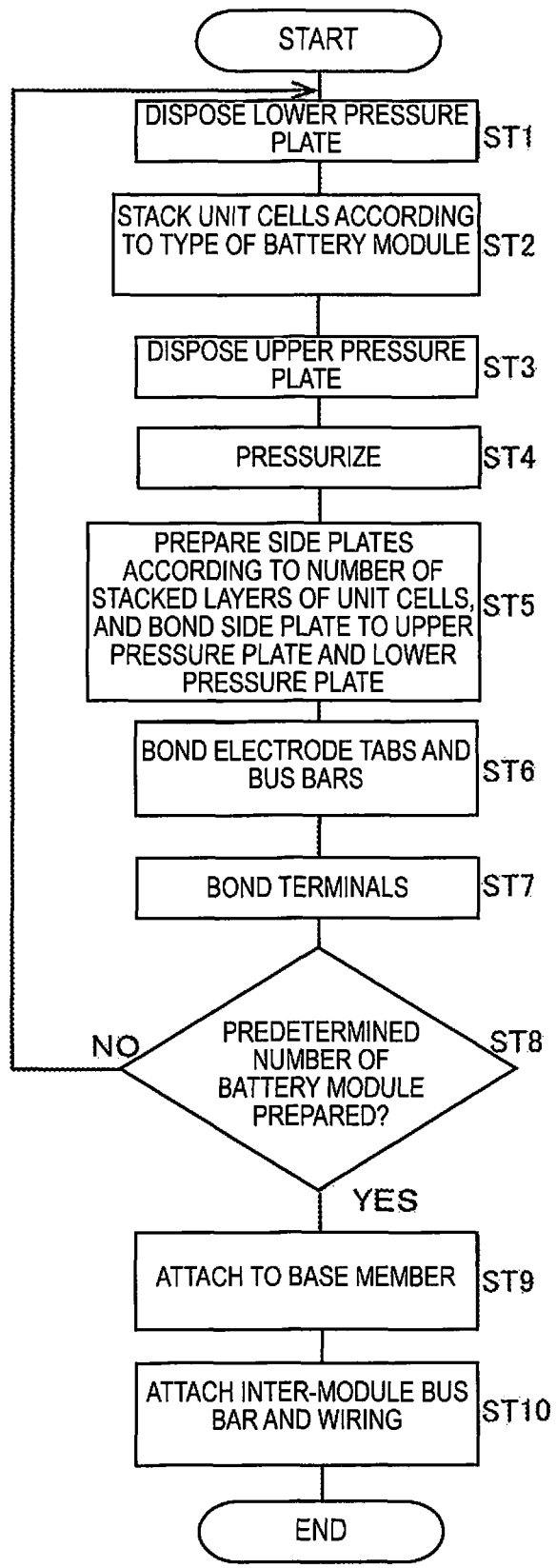
FIG. 15 is a flowchart illustrating a method for producing a battery pack according to the first embodiment.

Next, the method of producing the battery pack 10 will be described, with reference to FIGS. 15-22. FIG. 15 is a flowchart illustrating a method for producing the battery pack 10 according to the first embodiment.

To summarize with reference to FIG. 15, the method of producing the battery pack 10 comprises disposing the lower pressure plate 152 (Step ST1), stacking the unit cells 110 (Step ST2), disposing the upper pressure plate 151 (Step ST3), pressurization (Step ST4), joining the side plate 153 to the upper pressure plate 151 and the lower pressure plate 152 (Step ST5), joining the electrode tab 113 and bus bar 131 (Step ST6), joining the anode side terminal 133 and cathode side terminal 134 (Step ST7), attaching the battery modules 100A, 100B to the base member 310 (Step ST9), and attaching the inter-module bus bars 410, 420, 430 (Step ST10). For the sake of convenience, Step ST1 to Step ST3 will be referred to as the stacking step, Step ST4 will be referred to as the pressurizing step, Step ST5 will be referred to as the first joining step, Step ST6 and Step ST7 will be referred to as the second joining step, and Steps ST9 and 10 will be referred to as the attaching step. The steps described above are referred to for convenience of description and do not need to be termed or distinguished as described above, as long as each of the following operations are the same.

First, the stacking step for stacking the members configuring the battery modules 100A, 100B (Step ST1 to Step ST3) will be described, with reference to FIG. 16.

Figure 16:
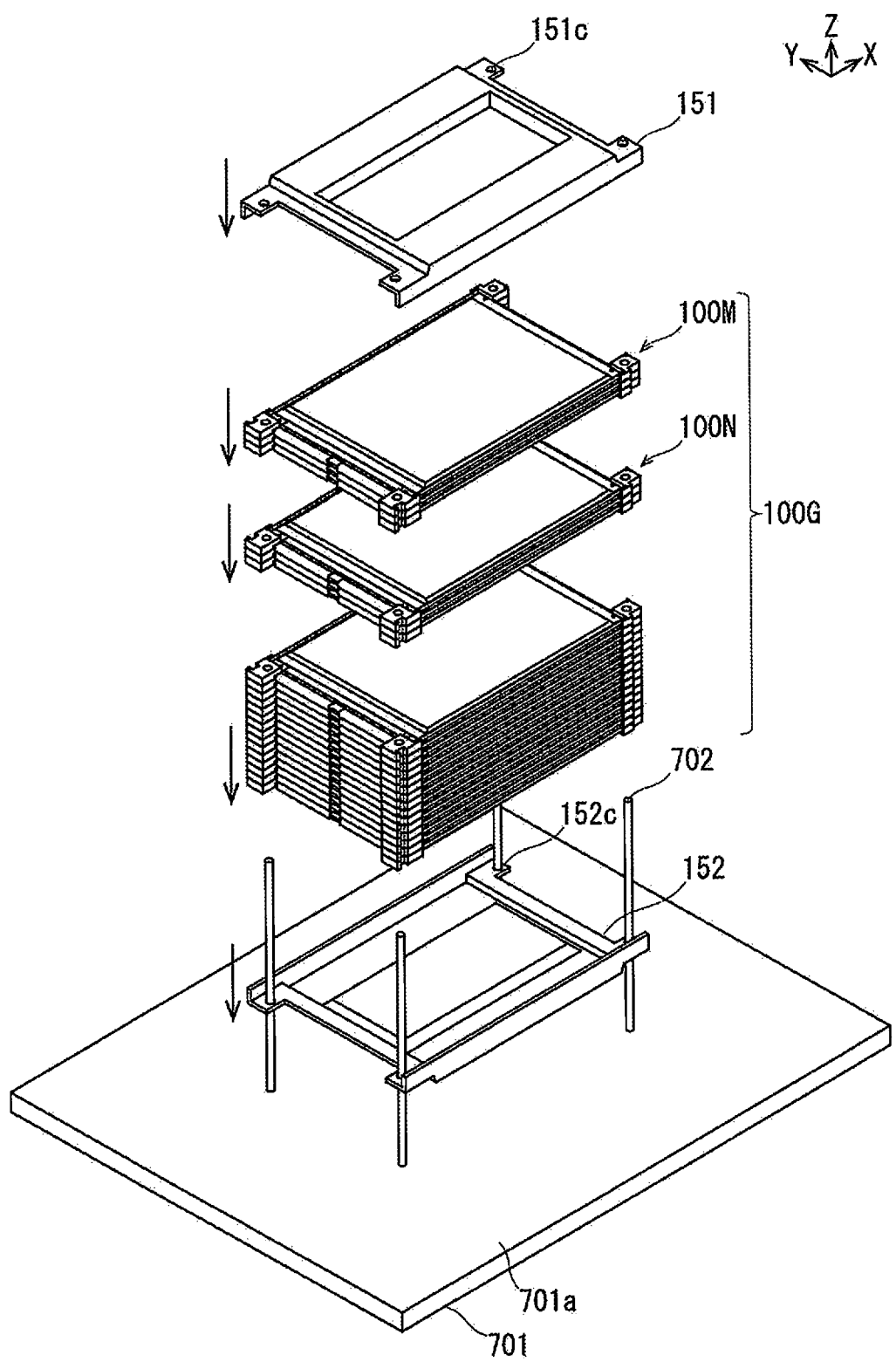
FIG. 16 is a view illustrating the method for producing the battery pack according to the first embodiment, and a perspective view schematically illustrating a state in which members constituting the battery module are sequentially stacked on a mounting table.

FIG. 16 is a view illustrating the method for producing the battery pack 10 according to the first embodiment and a perspective view schematically illustrating a state in which members constituting the battery module 100 are sequentially stacked on a mounting table 701.

The mounting table 701 used for the stacking step is formed in a plate shape and is provided along a horizontal plane. The mounting table 701 comprises locating pins 702 for positioning the relative positions of the lower pressure plate 152, the first cell sub-assembly 100M, the second cell sub-assembly 100N, and the upper pressure plate 151, which are sequentially stacked, along the longitudinal direction X and the short side direction Y. Four locating pins 702 are erected on the upper surface 701a of the mounting table 701 with predetermined intervals therebetween. The intervals between the four locating pins 702 from each other correspond, for example, to the intervals between the locating holes 152c provided on the four corners of the upper pressure plate 151. The members constituting the battery module 100 are stacked using a robot arm, a hand lifter, a vacuum adsorption type collet, or the like In the stacking step, the lower pressure plate 152 is lowered along the stacking direction Z and mounted on the upper surface 701a of the mounting table 701, in a state in which the locating holes 152c provided on the four corners thereof are inserted into the locating pins 702 by means of a robot arm, as illustrated in FIG. 16 (Step ST1). Next, the first cell sub-assembly 100M having unit cells 110 is lowered along the stacking direction Z, in a state in which the locating holes provided to the first spacer 121 and the second spacer 122, which are component members thereof, are inserted to the locating pins 702 by means of a robot arm. Then, the first cell sub-assembly 100M is stacked on the lower pressure plate 152. In the same manner, three sets each of the second cell sub-assembly 100N and the first cell sub-assembly 100M having unit cells 110 are alternately stacked by means of the robot arm (Step ST2). A double-sided tape 160 that is joined to a stacking member to be stacked above is adhered to the upper surfaces of the first cell sub-assembly 100M and the second cell sub-assembly 100N. Then, the upper pressure plate 151 is lowered along the stacking direction Z and stacked on the first cell sub-assembly 100M, in a state in which the locating holes 151c provided on the four corners thereof are inserted into the locating pins 702 by means of a robot arm (Step ST3).

Next, the pressurizing step for pressurizing the cell group 100G of the battery module 100 will be described with reference to FIG. 17.

Figure 17:
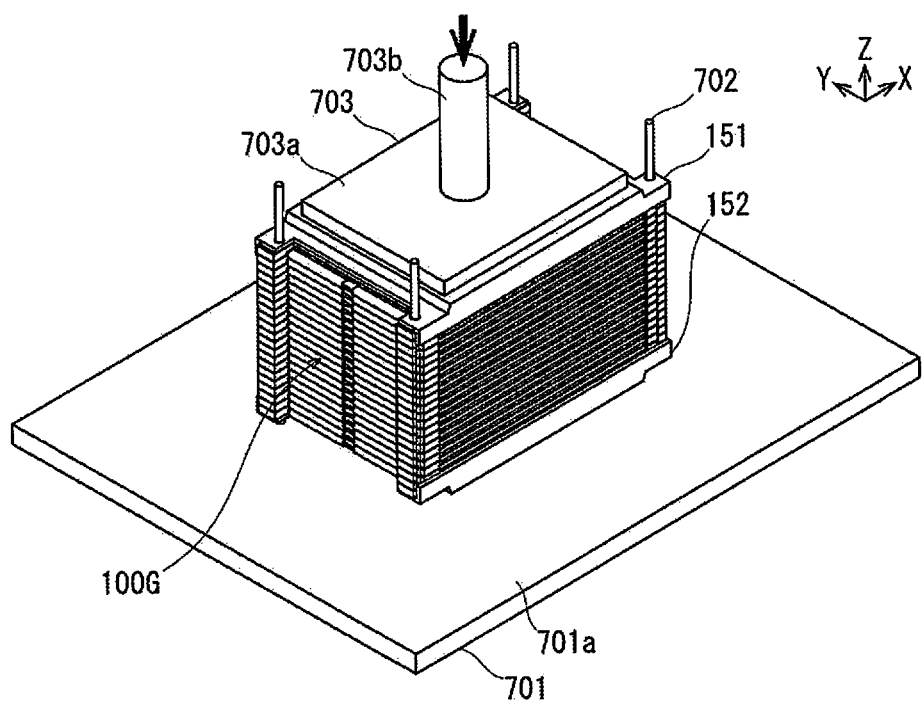
FIG. 17 is a perspective view schematically illustrating a state in which the component members of the battery module are pressed from above, following FIG. 16.

FIG. 17 is a perspective view schematically illustrating a state in which the component members of the battery module 100 are pressed from above, following FIG. 16.

A pressurizing jig 703 used in the pressurizing step comprises a pressurizing portion 703a that is formed in a plate shape and provided along a horizontal plane and a supporting portion 703b that is formed in a cylindrical shape and that is erected and joined to the upper surface of the pressurizing portion 703a. The supporting portion 703b connects a hydraulic cylinder and an electric stage that are driven along the stacking direction Z. The pressurizing portion 703a moves above and below along the stacking direction Z via the supporting portion 703b. The pressurizing portion 703a pressurizes the abutted stacking members (Step ST4).

In the pressurizing step, the pressurizing portion 703a of the pressurizing jig 703 is lowered downward along the stacking direction Z while being abutted on the upper pressure plate 151 by means of the electric stage connected to the supporting portion 703b being driven, as illustrated in FIG. 17. The cell group 100G is sandwiched and pressurized by means of the upper pressure plate 151 that is pressed downward and the lower pressure plate 152 that is mounted on the mounting table 701. An appropriate surface pressure is imparted to the power generation element 111 of each unit cell 110 provided on the cell group 100G. The pressurizing step is continued until the next joining step is completed.

Next, the first joining step in which the side plates 153 are joined to the upper pressure plate 151 and the lower pressure plate 152 will be described with reference to FIG. 18.

Figure 18:
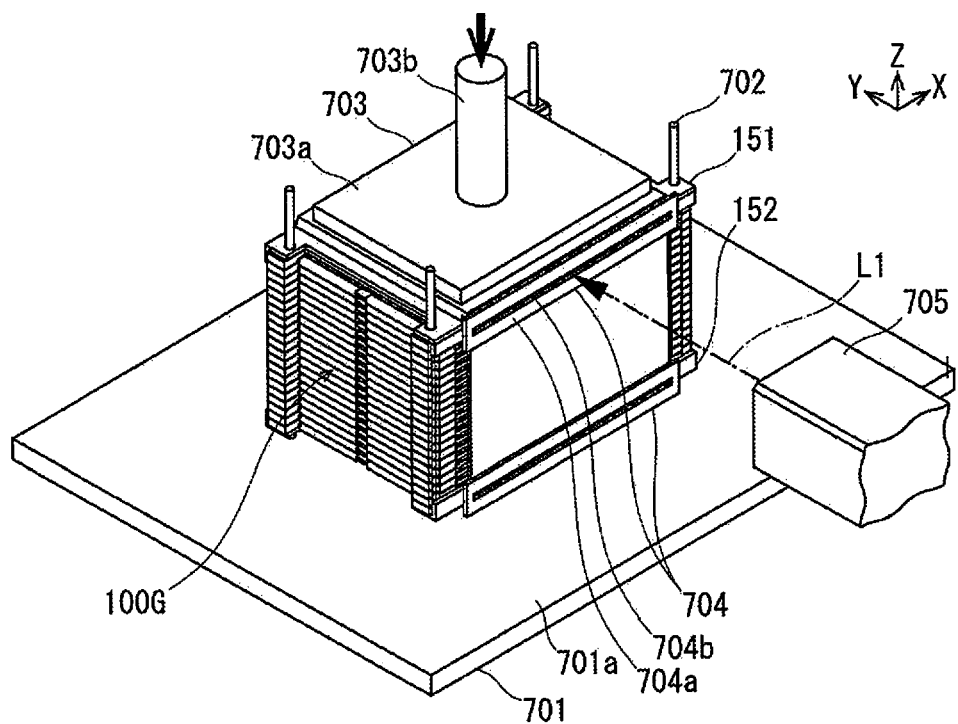
FIG. 18 is a perspective view schematically illustrating a state in which a side plate is laser-welded to an upper pressure plate and a lower pressure plate, following FIG. 17.

FIG. 18 is a perspective view schematically illustrating a state in which the side plates 153 are laser-welded to the upper pressure plate 151 and the lower pressure plate 152, following FIG. 17.

A pushing plate 704 used in the first joining step respectively presses the side plates 153 against the upper pressure plate 151 and the lower pressure plate 152, to respectively bring the side plates 153 in close contact with the upper pressure plate 151 and the lower pressure plate 152. The pushing plate 704 is made of metal and formed in an elongated plate shape. A linear slit 704b is opened in a main body 704a of the pushing plate 704 along the longitudinal direction. The short side direction of the pushing plate 704 is erected along the stacking direction Z. The pushing plate 704 presses the side plate 153 with the main body 704a and allows laser light L1 for welding to pass through the slit 704b.

A laser oscillator 705 entails a light source for joining the side plates 153 to the upper pressure plate 151 and the lower pressure plate 152. The laser oscillator 705 is configured from, for example, a YAG (yttrium aluminum garnet) laser. The laser light L1 that is led out from the laser oscillator 705 is irradiated onto the upper end 153a and the lower end 153b of the side plate 153, in a state in which the light path is adjusted, for example, by means of an optical fiber or a mirror and condensed by means of a condenser lens. The laser light L1 that is led out from the laser oscillator 705 may be split by means of a half-mirror and irradiated onto the upper end 153a and the lower end 153b of the side plate 153 at the same time.

In the first joining step, a laser oscillator 705 horizontally scans laser light L1 onto the upper end 153a of the side plate 153 that is pressed by the pushing plate 704 via the slit 704b of the pushing plate 704 and subjects the side plate 153 and the upper pressure plate 151 to seam welding at a plurality of locations, as illustrated in FIG. 18. In the same manner, the laser oscillator 705 horizontally scans laser light L1 onto the lower end 153b of the side plate 153 that is pressed by the pushing plate 704 via the slit 704b of the pushing plate 704 and subjects the side plate 153 and the lower pressure plate 152 to seam welding at a plurality of locations (Step ST5).

Next, from among the second joining step, the step in which the bus bar 131 is joined to the electrode tabs 113 of the unit cell 110 will be described, with reference to FIGS. 19-21.

Figure 19:
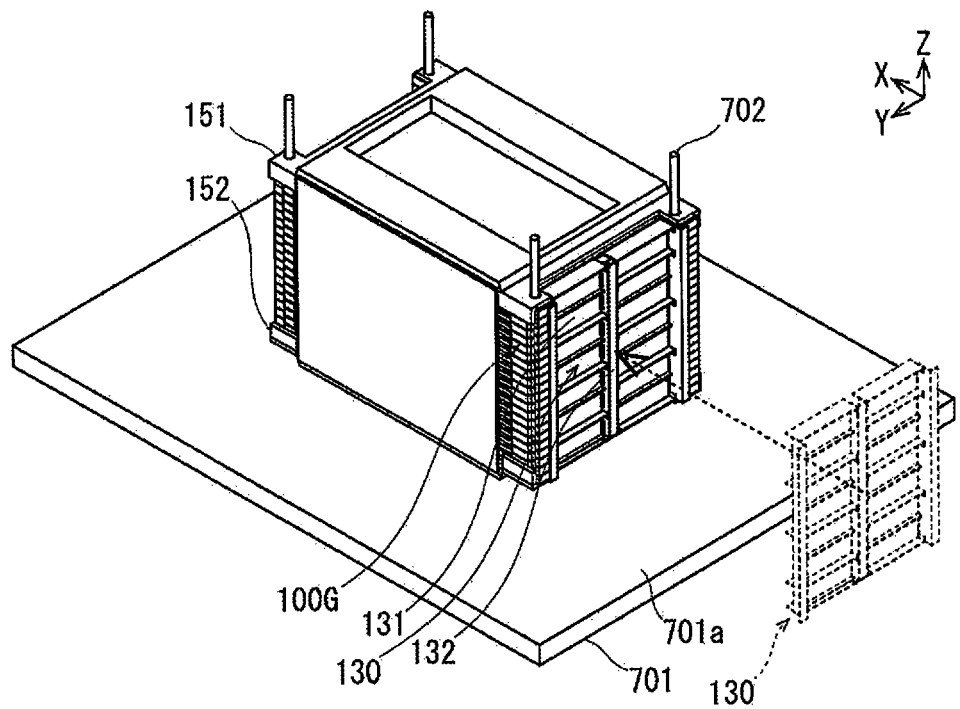
FIG. 19 is a perspective view schematically illustrating a state in which a part of the members of the bus bar unit is attached to the cell group, following FIG. 18.

FIG. 19 is a perspective view schematically illustrating a state in which a part of the members of the bus bar unit 130 is attached to the cell group 100G, following FIG. 18. FIG. 20 is a perspective view schematically illustrating a state in which the bus bar 131 of the bus bar unit 130 is laser-welded to the electrode tabs 113 of the unit cell 110, following FIG. 19. FIG. 21 is a side view illustrating a cross-section of the principle part of a state in which the bus bar 131 is laser-welded to the electrode tabs 113 of the stacked unit cells 110.

Figure 20:
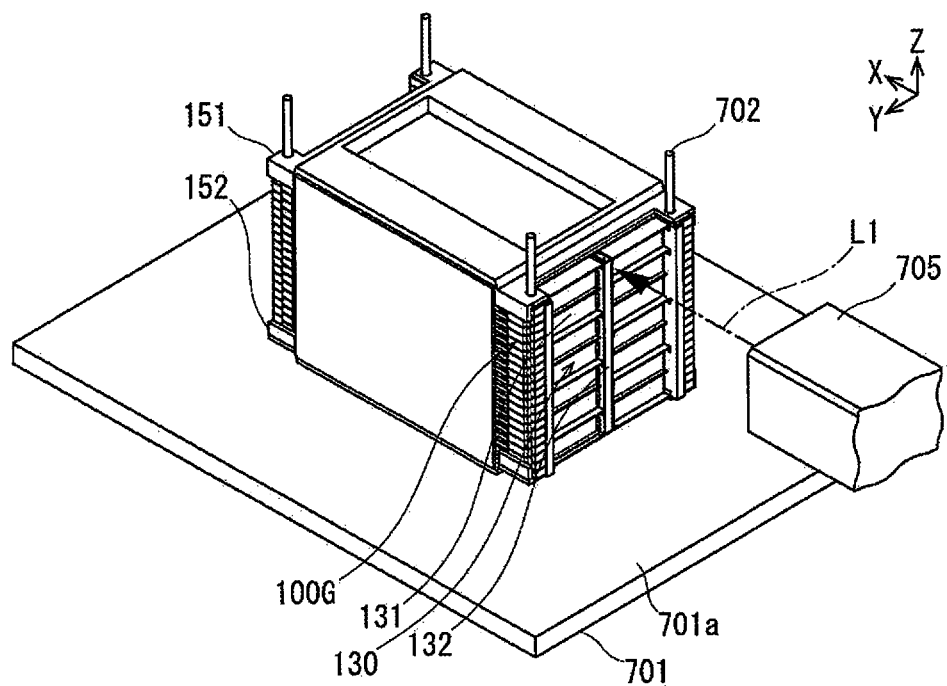
FIG. 20 is a perspective view schematically illustrating a state in which the bus bar of the bus bar unit is laser-welded to the electrode tabs of the unit cell, following FIG. 19.

In the second joining step, the mounting table 701 rotates 90 degrees counterclockwise in the drawing to cause the electrode tabs 113 of the cell group 100G and the laser oscillator 705 to face each other, as illustrated in FIG. 19 and FIG. 20. Furthermore, the bus bar holder 132, by which the bus bars 131 are integrally held, is kept pressed while being abutted on the corresponding electrode tabs 113 of the cell group 100G by means of a robot arm. Furthermore, the laser oscillator 705 irradiates the laser light L1 onto the bus bar 131 and joins the bus bar 131 and the distal end portions 113d of the electrode tabs 113 by seam welding or spot welding, as illustrated in FIG. 20 and FIG. 21. Then, the anode side terminal 133 is joined to the anode side bus bar 131A corresponding to the anode side terminal end (upper right in FIG. 9), from among the bus bars 131 arranged in a matrix, as illustrated in FIG. 21. In the same manner, the cathode side terminal 134 is joined to the cathode side bus bar 131K corresponding to the cathode side terminal end (lower left in FIG. 9), from among the bus bars 131 arranged in a matrix (Step ST6).

Next, from among the second joining step, the step in which a protective cover 140 is attached to the bus bar 131, and the anode side terminal 133 and the cathode side terminal 134 are joined to the bus bar 131 will be described, with reference to FIG. 22.

Figure 21:
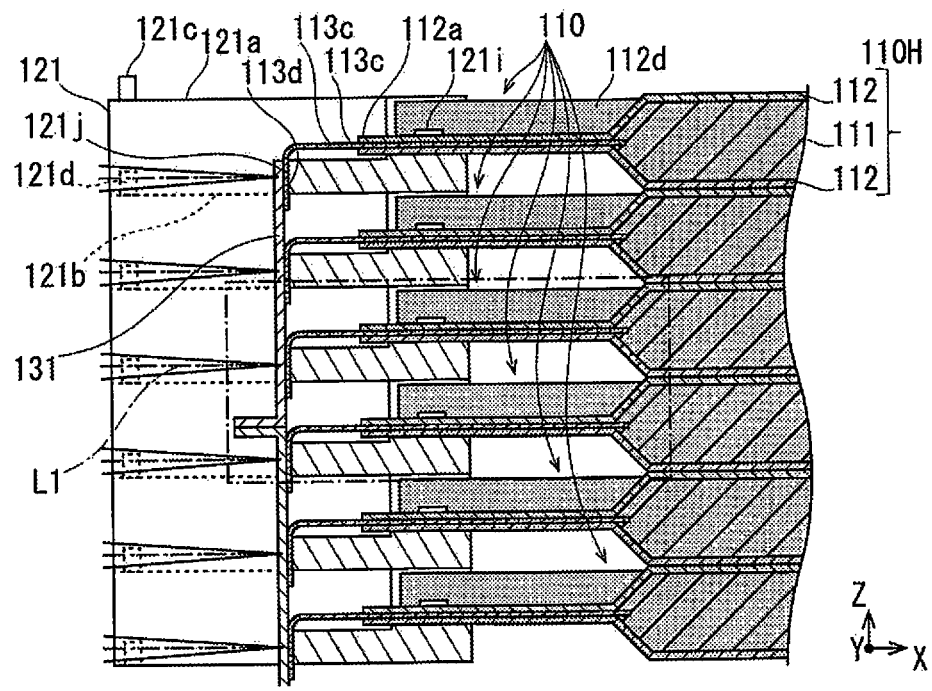
FIG. 21 is a side view illustrating a cross-section of the principle part of a state in which the bus bar is laser-welded to the electrode tabs of the stacked unit cells.
Figure 22:
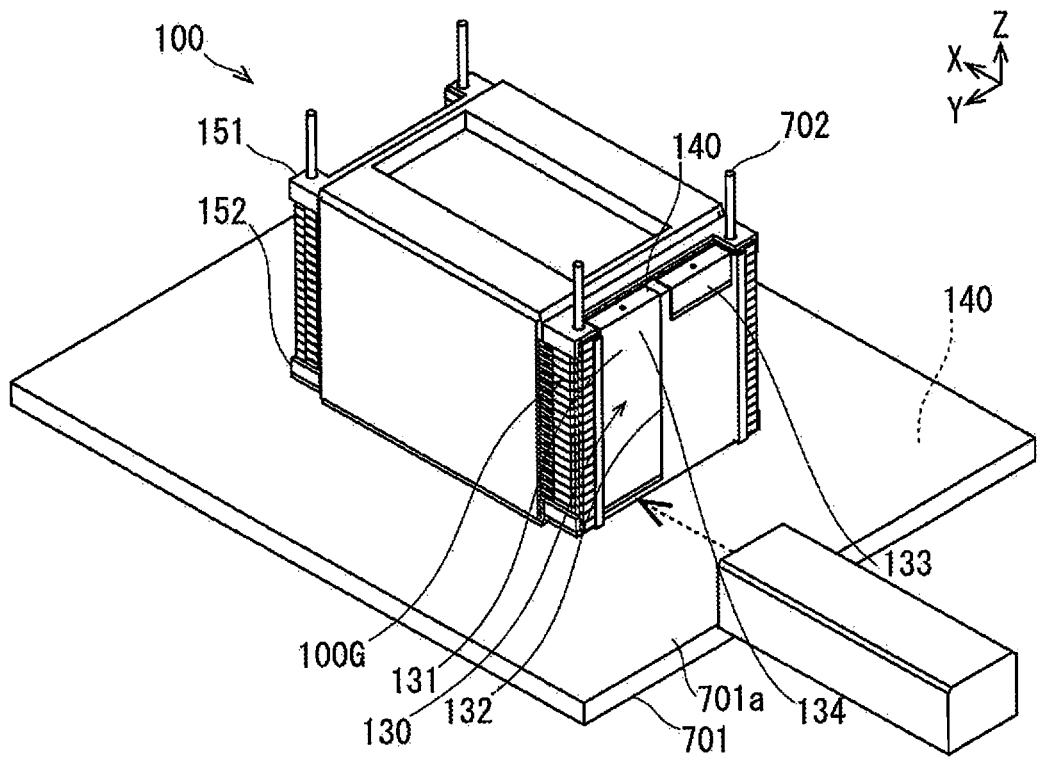
FIG. 22 is a perspective view schematically illustrating a state in which a protective cover is attached to a bus bar unit, and an anode side terminal and a cathode side terminal are laser-welded to an anode side bus bar and a cathode side bus bar, following FIG. 20 and FIG. 21.

FIG. 22 is a perspective view schematically illustrating a state in which a protective cover is attached to a bus bar unit, and an anode side terminal and a cathode side terminal are laser-welded to an anode side bus bar and a cathode side bus bar, following FIG. 20 and FIG. 21.

Here, a protective cover 140 is attached to the bus bar unit 130 while fitting the upper end 140*b* and the lower end 140*c* of the protective cover 140 to the bus bar unit 130, using the robot arm. The upper end 140*b* and the lower end 140*c* of the protective cover 140 may be joined to the bus bar unit 130 by means of an adhesive. Then, laser light is irradiated from the first opening 140*d* to weld the anode side terminal 133 to the anode side bus bar 131A, as illustrated in FIG. 22. In the same manner, laser light is irradiated from the second opening 140*e* to weld the cathode side terminal 134 to the cathode side bus bar 131K (Step ST7). The protective cover 140 covers the bus bar unit 130 to prevent the bus bars 131 from short-circuiting with each other and from coming in contact with an external member and being short-circuited or causing electrical leakage. Thereafter, the battery module 100 is removed from the mounting table 701 and carried out to an inspection step for inspecting the battery performance, and the like.

The battery pack 10 according to the present embodiment uses 16 battery modules, as illustrated in FIG. 1A, FIG. 1B, and the like. At this time, only one battery module has been formed (Step ST8: NO). Therefore, Step ST1 to Step ST7 are repeated until a total of 16 battery modules 100A, 100B have been prepared. As described above, the battery module 100A and the battery module 100B have different numbers of stacked layers of the unit cell 110 and different specifications of the side plates 153. Accordingly, in Step S2, the number of stacked layers of the unit cells 110 is changed according to the specification of the battery module. In the same manner, in Step ST5, the specification of the side plate 153 to be used is changed according to the specification of the battery module.

When a total of 16 battery modules 100A, 100B have been prepared (Step ST8: YES), the battery modules 100A, 100B are attached to the base member 310 using brackets 320, bolts 330, and nuts 340, in the attaching step (Step ST9). The battery modules 100A, 100B are not stacked in a direction crossing the base portion 300 and are disposed on one level. Then, one of the inter-module bus bars 410, 420, 430 or the wiring 440 is attached to the battery modules 100A, 100B (Step ST10).

Then, the operation from Step ST1 to Step ST10 may be embodied by an automatic machine in which all of the steps are controlled by means of a controller, a semiautomatic machine in which a portion of the steps are carried out by a worker, or a manual machine in which all of the steps are carried out by a worker.

Action and Effects

According to the battery pack 10 and the method for producing the battery pack 10 according to the first embodiment described above, the following action and effects are achieved.

In the first embodiment, the attachment portions of the inter-module bus bars 410, 420, 430 or the wiring 440 attached to each of the anode side terminal 133 and the cathode side terminal 134 of the battery modules 100A, 100B are disposed on an end portion on the opposite side of the base member 310 side, and the battery modules 100A, 100B are arranged on a mounting portion 311 of the base member 310 along the mounting portion. Since the number of unit cells 110 and battery modules 100 attain a large number, by configuring as described above, it becomes unnecessary to dispose the inter-module bus bar 410, etc. on the lower portion near the base portion 300. In the inter-module bus bar 410, and the like, components of the battery pack are not disposed on the opposite side of the base member 310. Therefore, the space in which components of the battery pack are not present can be used as an operating space when attaching the inter-module bus bar 410, and the like. Therefore, it is possible to not provide, or make it difficult to provide, an operating space between adjacent battery modules. Accordingly, it is possible to achieve a battery pack that can be assembled, even if the intervals between battery modules are relatively small. In addition, by being able to make the intervals between battery modules relatively small, the proportion of the space occupied by the battery modules among the entire battery pack can be increased, which could lead to downsizing of the battery pack. In addition, the effect described above can be exerted by disposing the battery modules 100A, 100B on one level, without stacking, on the base member 100A, 100B.

In addition, adjacent columns in FIG. 1C, in other words, the anode side terminal 133 and the cathode side terminal 134 of the battery module 100A adjacent in the longitudinal direction X, are configured to oppose the anode side terminal 133 and the cathode side terminal 134 of the battery module 100B. Accordingly, at this site, it is possible to shorten the inter-module bus bar 420 and to make the layout of the bus bar compact. Additionally, in the battery module 100, the surface of the electrode tab 113 is disposed on the same side as the surfaces of the anode side terminal 133 and the cathode side terminal 134. Accordingly, it is possible to make the length of the component necessary for electrical connection, not only between battery modules, but also between the electrode tab and the terminal, relatively short.

In addition, in FIG. 1C, the bolts 450 are inserted in the stacking direction Z, but no limitation is imposed thereby; the bolts 450 may be attached on the side surface of the battery module 100, as long as the operating space for bolts 450, and the like, can be reduced between adjacent battery modules. In this case, the height from the base member 310 of the anode side terminal 133 and the cathode side terminal 134 of the battery module 100A opposing each other, and the height from the base member 310 of the anode side terminal 133 and the cathode side terminal 134 of the battery module 100B, are preferably configured to be different, as illustrated in FIG. 1C. If the heights of the bolt attachment positions of the inter-module bus bars between adjacent battery modules are the same, there is the risk that about twice the operating space will be necessary, compared to when the heights of the bolt attachment positions are different, as illustrated in FIG. 14. Accordingly, by configuring as described above, it is possible to make the intervals between battery modules relatively small. If the number of stacked layers of the unit cells between adjacent battery modules is different, as illustrated in FIG. 1C, the bolt attachment position of the inter-module bus bar of a battery module having a high number of stacked layers is preferably provided at a position higher than the upper portion of a battery module having a low number of stacked layers, from the point of view of operating space.

In addition, bolts 330 are inserted into a plurality of unit cells 110 in a direction crossing the base portion 300 and fastened to nuts 340, to thereby fix the battery modules 100A, 100B to the base member 310 via brackets 320. The operating space for the bolts to be inserted into the unit cells in the battery module changes depending on how the battery module is placed with respect to the base portion. If the battery module were disposed such that the unit cells are stacked parallel to the base portion, tools, etc. could enter along the direction of the gap between the battery modules; therefore, more operating space becomes necessary. In contrast, by inserting the bolts 330 in a direction that crosses the base portion 300, it is possible to effectively utilize the space in which components of the battery pack are not present, to reduce the required operating space between the battery modules.

In addition, the brackets 320 are connected to the battery modules 100A, 100B, by being fitted to the shape of a recessed portion 100F formed from the stacking portion 100C to the insertion portion 100D, whose length in the stacking direction Z is shorter than that of the stacking portion 100C. Accordingly, even if external force acts on the battery pack 10, it is possible the brackets 320 may be caused to function to strengthen the rigidity of the portion of the insertion portion 100D.

In addition, the site of the head portion of the bolt, among the portions of the insertion portion 100D in which the bolt 330 is disposed, is configured to have a length that does not exceed the upper pressure plate 151 positioned at the end portion of the stacking portion 100C, as illustrated in FIG. 6. Accordingly, it is possible to reduce the volume of the entire battery pack, compared to a case in which the bolt protrudes farther than the stacking portion. Therefore, when mounting the battery pack 10 on, for example, a vehicle, it becomes advantageous with regard to the clearance of adjacent components, and the like, and it becomes possible to improve the applicability of the battery pack 10.

Additionally, the side plates 153 are joined to the upper pressure plate 151 and the lower pressure plate 152 in a state in which the cell group 100G is pressurized in the stacking direction Z by means of the upper pressure plate 151 and the lower pressure plate 152. Accordingly, it is possible to firmly fix the cell group 100G using the upper pressure plate 151, lower pressure plate 152, and the side plate 153 and to improve reliability with respect to shock.

In addition, the battery modules 100A, 100B are configured to use the same upper pressure plate 151 and lower pressure plate 152, regardless of the number of stacked layers of unit cells 110. In other words, members such as the side plate 153 related to the stacking direction Z in accordance with the number of stacked layers are changed according to the number of stacked layers of unit cells 110. Accordingly, it is possible to flexibly adjust the number of unit cells to be mounted on one battery module. Therefore, it is possible to flexibly adjust the layout, performance, and the like of the battery pack.

Second Embodiment

Figure 23:
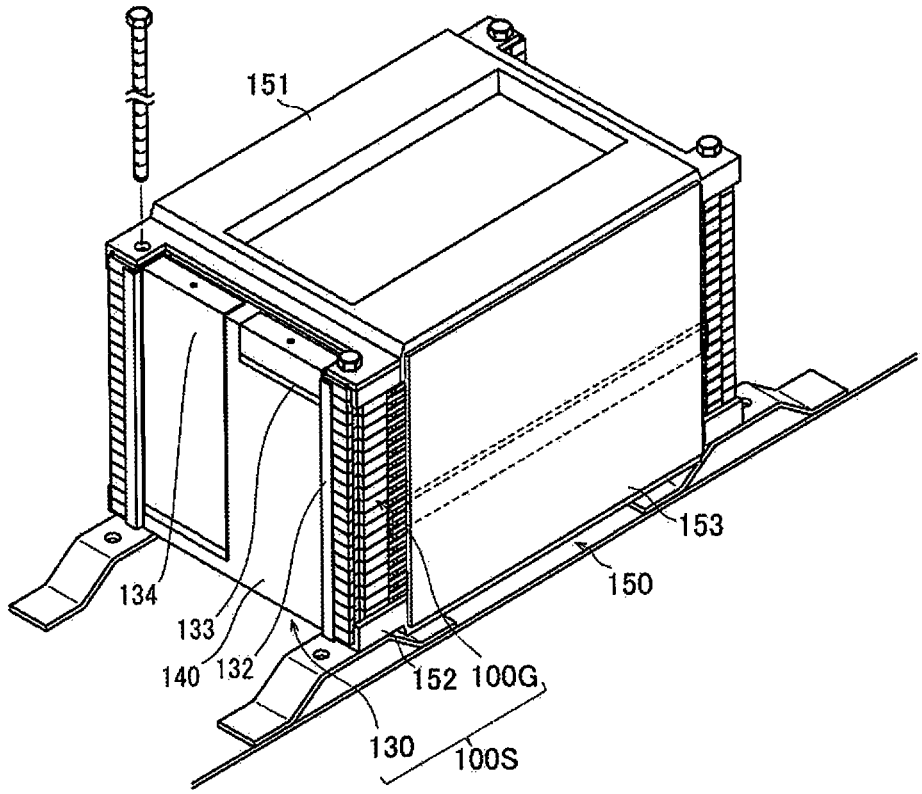
FIG. 23 is a perspective view illustrating battery modules that constitute a battery pack according to the second embodiment.

The method for producing the battery pack according to the second embodiment will be described. FIG. 23 is a perspective view illustrating battery modules according to the second embodiment, and FIG. 24 is a partial cross-sectional view illustrating the inside of a battery module in the battery pack according to the second embodiment.

In the first embodiment, an embodiment was described in which a first cell sub-assembly 100M and a second cell sub-assembly, in each of which three of the unit cells 110 are stacked, are stacked between an upper pressure plate 151 and a lower pressure plate 152. However, it is also possible to configure as follows.

Figure 24:
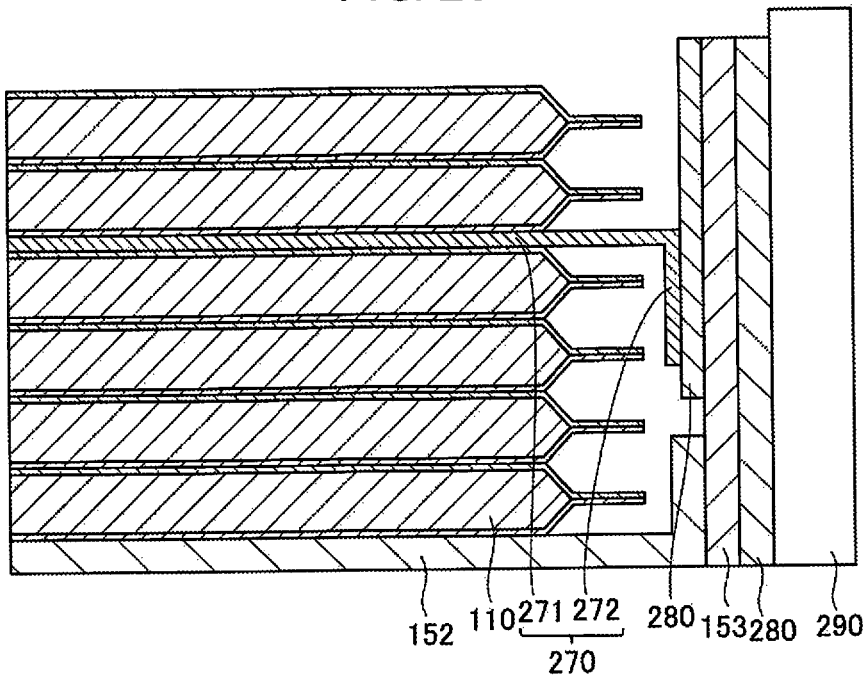
FIG. 24 is a partial cross-sectional view illustrating the inside of a battery module in the battery pack according to the second embodiment.

In the battery module 200 according to the second embodiment, a heat dissipation member 270 (corresponding to a heat transfer member) that dissipates heat that may be generated to the outside when using the battery pack, is disposed between the first cell sub-assembly 100M and the second cell sub-assembly 100N, as illustrated in FIG. 23 and FIG. 24. The heat dissipation member 270 comprises a cell contact portion 271 that comes in contact with the first cell sub-assembly 100M or the second cell sub-assembly 100N and a heat dissipation portion 272 that comes in contact with a side plate 253, which is an outer wall, for dissipating heat obtained from the cell contact portion 271 to the outside. In addition, the side plate 253 comes in contact with the heat dissipation member 270 via an insulating member 280.

The heat dissipation member 270 is configured from a material such as aluminum, having a thermal conductivity rate that is higher than the laminate film 112 that covers the power generation element 111 of the unit cell 110, excluding the electrode tab 113. In the heat dissipation member 270, for example, a flat plate made of aluminum, or the like, may be bent at the end portions, the vicinity of the center may be set as the cell contact portion 271, and the bent end portions may be set as the heat dissipation portion 272. However, it is not limited to the above as long as heat that is generated from the first cell sub-assembly 100M, and the like, can be dissipated to the outside. An insulating member 280 may be disposed on the outside of the side plate 253, and a water jacket 290, or the like, may be disposed further on the outside thereof, to carry out heat dissipation, and the like. In addition, in FIG. 24, one heat dissipation member 270 is disposed between the fourth and fifth unit cells 110 from the bottom. However, the number and positions of the heat dissipation members 270 are not limited to the above and may be changed appropriately. Additionally, a gap may be provided between the cell group 100G and the side plate 153, and outside air may be introduced to the gap portion. In the second embodiment, the configurations of the heat dissipation member 270, the insulating member 280, and the water jacket 290 are different from the first embodiment, and the other configurations are the same as the first embodiment; therefore, descriptions of the other configurations are omitted.

Action and Effects

Next, the action and effects of the second embodiment will be described. The second embodiment is configured to dispose a heat dissipation member 270 having a higher thermal conductivity rate than the laminate film 112, in any position in the stacking direction Z of the cell group 100G, in which a first cell sub-assembly 100M and a second cell sub-assembly 100N are stacked. In the battery module 200, a chassis is configured from a side plate 153, whose dimensions are changed according to the number of stacked layers of the unit cells 110, an upper pressure plate 151, and a lower pressure plate 152, regardless of the number of stacked layers of the unit cells 110, in the same manner as the first embodiment. The number and positions of the heat dissipation members 270 according to the present embodiment may be freely adjusted according to modes in which the unit cells 110 are connected in parallel or series, in other words, according to the heat dissipation amount per unit volume. In this way, the battery pack 10 can be efficiently cooled.

Figure 25A:
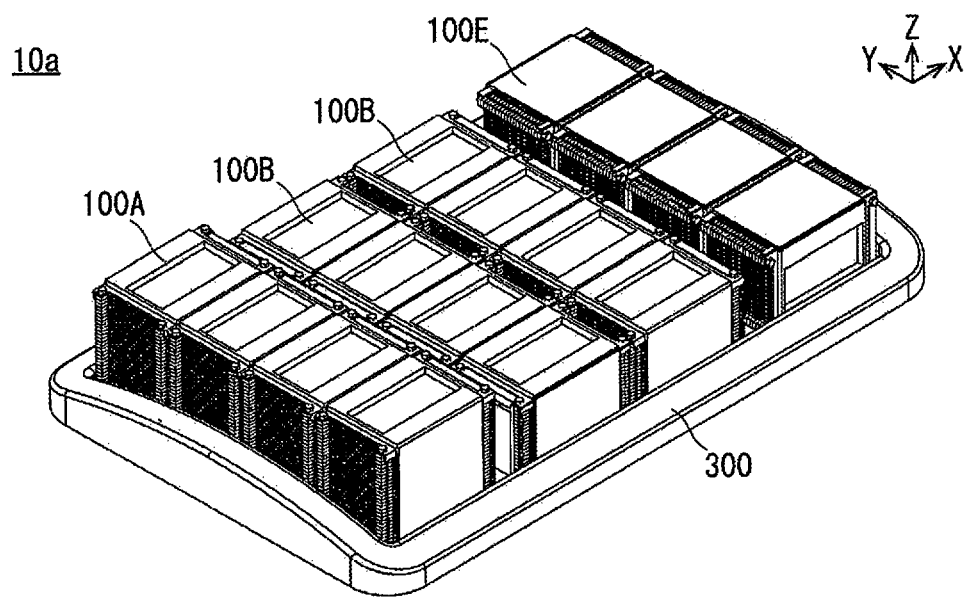
FIG. 25A and FIG. 25B are a schematic perspective view and a schematic plan view of modified examples of FIG. 1A and FIG. 1B.
Figure 25B:
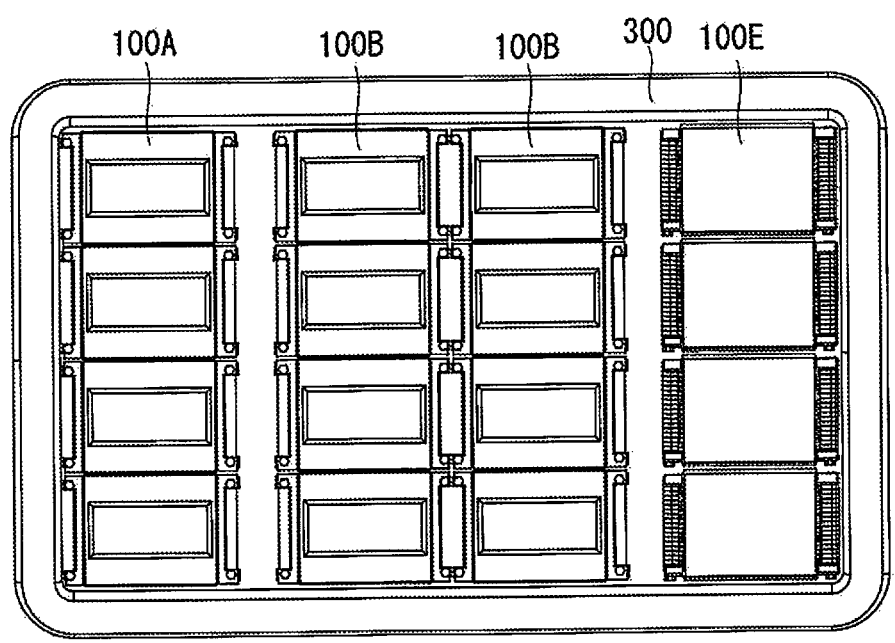

The present invention is not limited to the embodiment described above, and various modifications are possible within the scope of the claims. FIG. 25A and FIG. 25B are a schematic perspective view and a schematic plan view of modified examples of FIG. 1A and FIG. 1B. In FIG. 25A and FIG. 25B, drawings of the inter-module bus bar and the wiring are omitted for convenience of description.

In the first embodiment, a configuration in which the battery modules 100A, 100B are mounted such that the direction perpendicular to the mounting portion 311 of the base member 310 matches the stacking direction of the unit cells 110, as illustrated in FIG. 1B and FIG. 1C. However, no limitation is imposed thereby, and the battery pack 10a may be configured from a battery module 100A in which unit cells 110 are stacked in a direction perpendicular to the mounting portion 311 of the base member 310, and a battery module 100E in which unit cells 110 are stacked in a direction parallel to the mounting portion 311, as illustrated in FIG. 25A and FIG. 25B.

Here, a case in which unit cells 110 are stacked perpendicular to the base portion 300, as in the battery module 100A, is referred to as vertical mounting, and a case in which unit cells 110 are disposed parallel to the base portion 300, as in the battery module 100E, is referred to as horizontal mounting. By arranging the battery module horizontally on the base member 310, as in the battery module 100E, it is possible to dispose the battery modules without being restricted by the width dimension of the battery module 100 when viewed in plan view from the stacking direction. In the battery module 100 according to the first and second embodiments, since the number of stacked layers of the unit cells can be freely adjusted, it is possible to efficiently dispose the battery modules in a small space by disposing horizontally.

In addition, an embodiment was described in which the battery modules constituting the battery pack entail two types of battery modules 100A, 100B, but no limitation is imposed thereby. The number of types of battery modules may be two or more, or it may be one. Additionally, the number of battery modules disposed in the battery pack 10 was described as 16, which is merely an example, and is not limited to 16.

In addition, an embodiment was described above in which the bus bars are joined to each other by ultrasonic joining and the electrode tabs and the bus bars are joined by laser welding, but no limitation is imposed thereby. The bus bars, or the electrode tabs and the bus bars, may be joined by welding. Additionally, an embodiment was described above in which adjacent electrode tabs are joined to the bus bar, but no limitation is imposed thereby. In addition to the above, the electrode tabs may be joined to each other by ultrasonic joining or welding.

Figure 26:
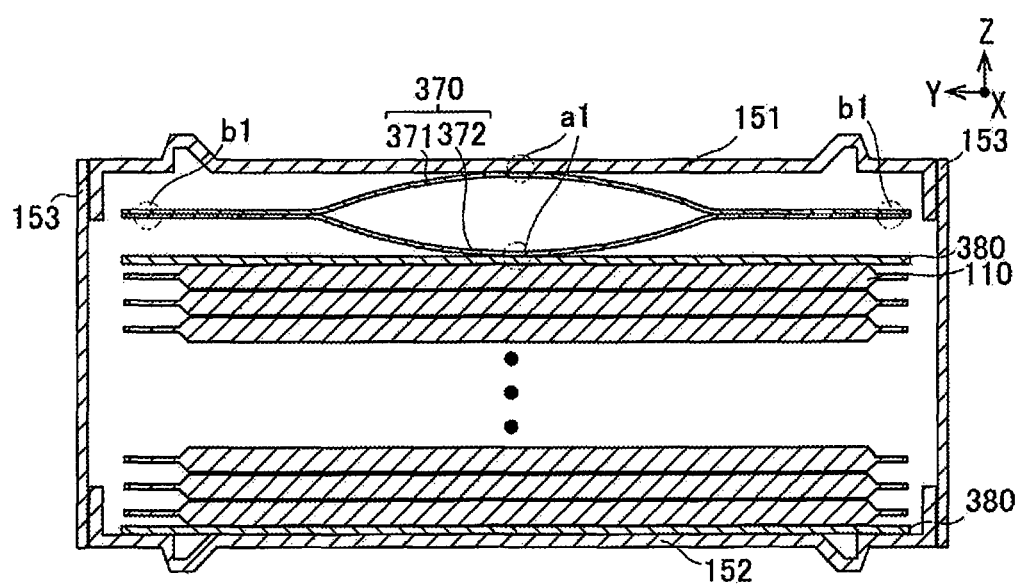
FIG. 26 is a cross-sectional view cut along the stacking direction of a battery module and a cross-sectional view illustrating a modified example of the first embodiment.

FIG. 26 is a cross-sectional view cut along the stacking direction of a battery module and a cross-sectional view illustrating a modified example of the first embodiment. In the first embodiment, an embodiment was described in which a cell group 100G obtained by stacking a plurality of unit cells 110 is disposed between an upper pressure plate 151 and a lower pressure plate 152, which configure a chassis 150. However, no limitation is imposed thereby, and an elastic member 370 that generates elastic force in the stacking direction Z may be provided in addition to the plurality of unit cells 110. The elastic member 370 is disposed in one position in the stacking direction Z. The elastic member 370 comprises elastic members 371, 372, which are mainly elastically deformed in the substantially center position in FIG. 26, and is joined to an adjacent member at point a1. The elastic member 370 is joined to an adjacent member, but is preferably joined to a plate-shaped intermediate member 380, as illustrated in FIG. 26. The elastic member 371 and the elastic member 372 are joined at point b1, which is further outward than point a1.

By configuring in this manner, even if the thickness of the unit cells 110 in the stacking direction Z changes over time, due to charging and discharging when using the battery pack, the elastic member 370 absorbs the changes in the thickness direction, and it is possible to prevent the movement of the unit cells 110 when external force is applied.

The invention claimed is:

1. A battery pack comprising:
a plurality of battery modules including a plurality of unit cells are stacked in a stacking direction, each of the unit cells having a flat shape and positive and negative terminals for transferring input and output of electric power; and
a base member on which the battery modules are mounted,
the terminals of the battery modules being disposed at an end portion on a side opposite of the base member in the battery module, and the battery modules being arranged on a mounting surface of the base member,
each of the unit cells including a cell body that includes a power generation element and an electrode tab protruding out from the cell body,
each of the battery modules including a pair of first cover members for covering the unit cells from both sides in the stacking direction and a pair of second cover members for covering the unit cells from both sides in a direction that intersects with the stacking direction and that also intersects with a direction in which the electrode tab extends,
the second cover members being welded to the first cover members in a pressurized state in which the stacked unit cells are pressurized in the stacking direction by the first cover members such that a height of the plurality of stacked unit cells is lower in the pressurized state than a height of the plurality of stacked unit cells in a non-pressurized state,
at least one of the battery modules being mounted to the base member by bolts inserted through corners of each of the at least one of the battery modules,
an end portion of each of the bolts being attached to a bracket of the base member,
each of the at least one of the battery modules including bus bars connecting the electrode tabs, the terminals being joined to the bus bars and superimposed on the bus bars and the electrode tabs from an exterior of the battery module,
the terminals, electrode tabs, and bus bars being disposed between bolts on sides of the surface of the battery module, and,
the terminals of one of the battery modules and the terminals of an adjacent one of the battery modules, which face each other, being at different heights from the base member.

2. The battery pack according to claim 1, wherein each the battery modules is not stacked but is disposed on one level on the base member.

3. The battery pack according to claim 1, wherein each of the battery modules includes a stacked portion in which the unit cells are stacked and an insertion portion that receives the bolts, a length of the bolts in the stacking direction is shorter than a length of the stacked portions, for each of the battery modules, the stacked portion has a recessed portion disposed between the stacked portion and the insertion portion, and the brackets are connected to the battery modules by fitting into the recessed portion.

4. The battery pack according to claim 3, wherein each of the bolts has a head portion, and a length of the head portion does not exceed the length of the stacked portion.

5. The battery pack according to claim 1, wherein one of the battery modules is mounted on the base member in a state in which the stacking direction is perpendicular to the base member, and another of the battery modules is mounted on the base member in which the stacking direction of the unit cells is parallel to the base member.

6. The battery pack according to claim 1, wherein one electrode tab of the electrode tabs of the unit cells and one bus bar of the bus bars are ultrasonically joined or welded, and adjacent electrode tabs of the electrode tabs of the unit cells and adjacent bus bars of the bus bars are ultrasonically joined or welded.

7. The battery pack according to claim 1, wherein each of the unit cells comprises an external casing for covering the power generation element, and each of the battery modules further comprises a heat transfer member disposed in any position in the stacking direction, the heat transfer member further includes a member having a higher thermal conductivity rate than the external casing.

8. The battery pack according to claim 1, wherein each of the battery modules uses the first cover members, regardless of a number of stacked layers of the unit cells.

9. The battery pack according to claim 1, wherein one of the battery modules further comprises an elastic member disposed in any position in the stacking direction, and the elastic member generates elastic force along the stacking direction.

* * * * *